US008244073B2

(12) United States Patent
Okamura

(10) Patent No.: US 8,244,073 B2
(45) Date of Patent: Aug. 14, 2012

(54) LINE SHAPE PROCESSING DEVICE, LINE SHAPE PROCESSING METHOD, INFORMATION RECORDING MEDIUM, AND PROGRAM

(75) Inventor: Noriaki Okamura, Tokyo (JP)

(73) Assignee: Konami Digital Entertainment Co. Ltd., Tokyo (JP)

( * ) Notice: Subject to any disclaimer, the term of this patent is extended or adjusted under 35 U.S.C. 154(b) by 911 days.

(21) Appl. No.: 12/304,956

(22) PCT Filed: Jun. 20, 2007

(86) PCT No.: PCT/JP2007/062436
§ 371 (c)(1),
(2), (4) Date: Dec. 15, 2008

(87) PCT Pub. No.: WO2007/148731
PCT Pub. Date: Dec. 27, 2007

(65) Prior Publication Data
US 2009/0175542 A1 Jul. 9, 2009

(30) Foreign Application Priority Data
Jun. 22, 2006 (JP) ................. 2006-172208

(51) Int. Cl.
*G06K 9/20* (2006.01)
*G06K 9/46* (2006.01)
*G06F 3/041* (2006.01)
(52) U.S. Cl. .................. 382/312; 382/203; 345/173
(58) Field of Classification Search .................. 382/312, 382/313, 316, 100, 203, 202, 201; 345/173, 345/441
See application file for complete search history.

(56) References Cited

U.S. PATENT DOCUMENTS
5,596,656 A 1/1997 Goldberg
2005/0164784 A1 7/2005 Yamamoto et al.

FOREIGN PATENT DOCUMENTS
CN 1177407 A 3/1998
EP 0414565 A2 24/1990
(Continued)

OTHER PUBLICATIONS

De Leeuw, J. et al., "A New Computational Method to Fit the Weighted Euclidean Distance Model", Psychometrika, vol. 43, No. 4, Dec. 1978, pp. 479-490.
Lionheads Studio Ltd. / Electronic Arts, "Black & White Manual", Retrieved from http://www.replacementdocs.com on Jun. 30, 2006, 28 pages.

(Continued)

*Primary Examiner* — Yon Couso
(74) *Attorney, Agent, or Firm* — Howard & Howard Attorneys PLLC

(57) ABSTRACT

To detect the characteristic of the end portion of a line shape, in a line shape processing device (201), a coordinate storing unit (203) stores a first coordinate value of a point on a line in association with a second coordinate value, in regard to the shape of that line input by the user, a detecting unit (207) detects whether the shape of the end portion of the line input by the user is (a) a pennant shape where the vibration amplitude becomes narrow while vibrating, (b) a flag shape vibrating with a substantially constant vibration amplitude, or (c) a normal shape other than the shapes of (a) and (b) from the first coordinate value of the point in the stored line shape and the second coordinate value thereof based on the distribution of the extreme values of the second coordinate value.

8 Claims, 9 Drawing Sheets

FOREIGN PATENT DOCUMENTS

| | | |
|---|---|---|
| EP | 0414565 A3 | 24/1990 |
| EP | 1603078 A2 | 11/2004 |
| JP | H06-83920 | 3/1994 |
| JP | 10-240716 | 9/1998 |
| JP | 2001-034260 A | 2/2001 |
| JP | 2001-043390 A | 2/2001 |
| JP | 2001-210625 A | 8/2001 |
| JP | 2002-049747 | 2/2002 |
| JP | 2003-051014 | 2/2003 |
| JP | 2003-085381 | 3/2003 |
| JP | 2003-114760 | 4/2003 |
| JP | 2004-152175 | 5/2004 |
| JP | 2005-275652 | 10/2005 |
| WO | WO 97/20284 A1 | 6/1997 |

OTHER PUBLICATIONS

Smith, Steven H., "The Scientist and Engineer's Guide to Digital Signal Processing; Chapter 15-Moving Average Filters", California Technical Publishing, 1997, pp. 277-284.

Supplementary European Search Report of Sep. 3, 2009 for European Patent Application No. EP7767274, 7 pages.

Hayashi, "First Technical Analysis," Nikkei Inc., 1$^{st}$ Ed., Sep. 22, 1997, pp. 133-134.

Japanese Office Action JP2006-172208 dated Sep. 6, 2006, 6 pages.

Office Action for Chinese Patent Application No. 200780023420.X dated Jun. 29, 2010 and English translation, 19 pages.

International Search Report PCT/JP2007/062436 dated Sep. 4, 2007.

Japanese Office Action with English Translation (issued Dec. 19, 2006).

FIG. 3
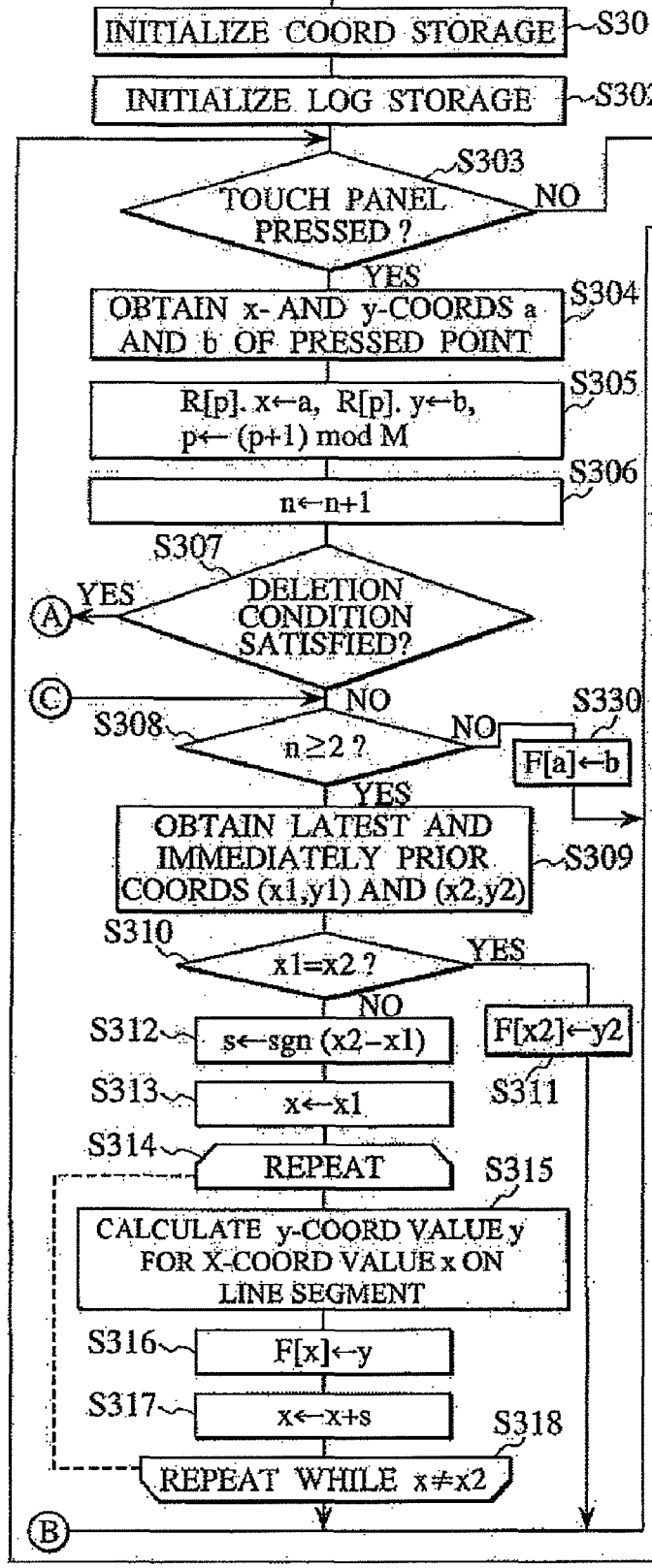
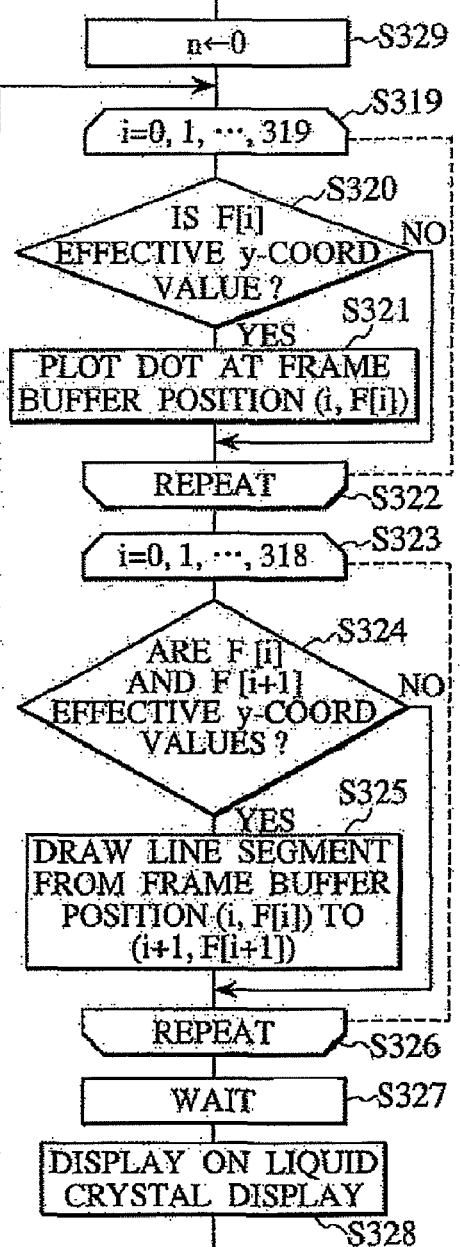

FIG. 4
(A)
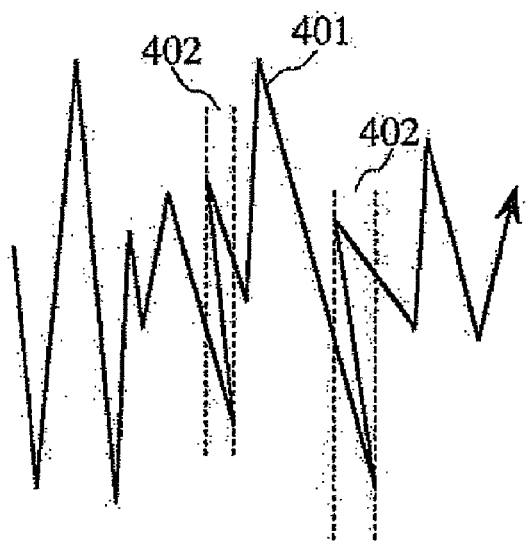
(C)
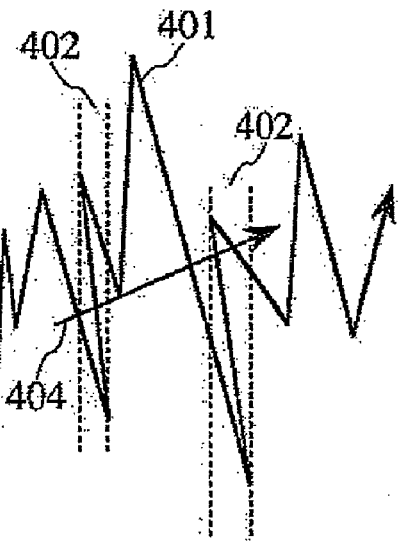
(B)
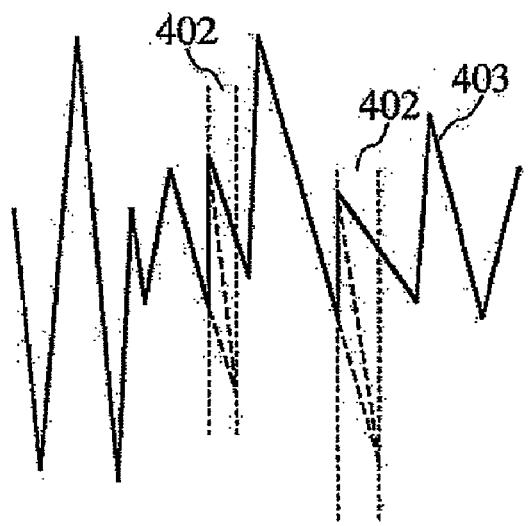
(D)
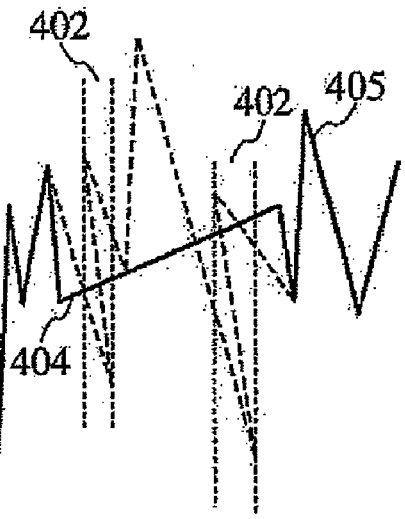

FIG. 7
(a)
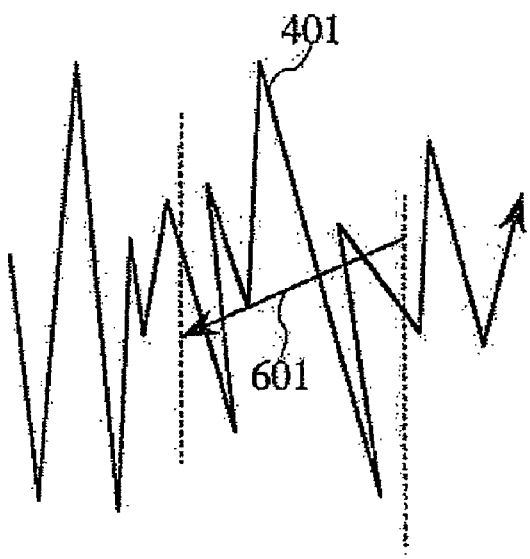
(b)
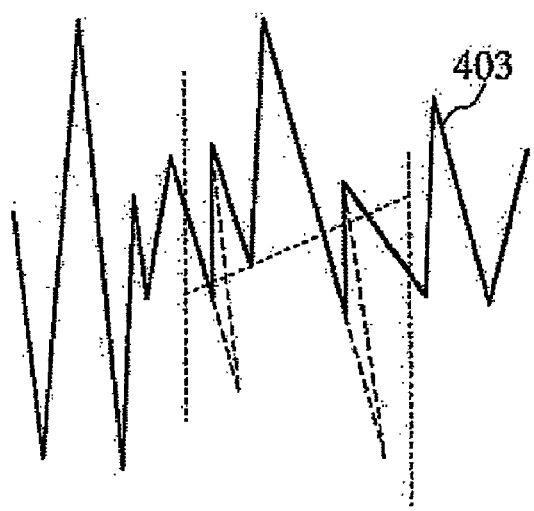
(c)
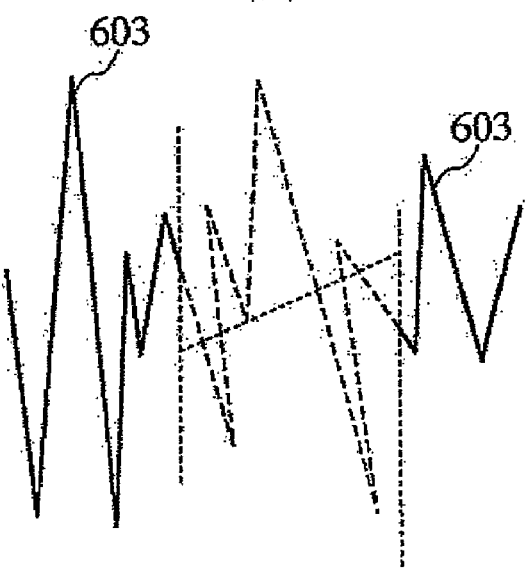

FIG. 8
(a)
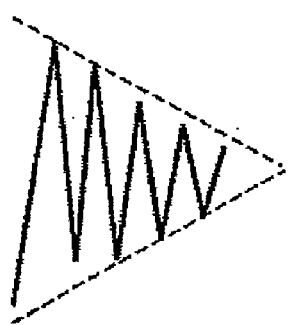
(d)
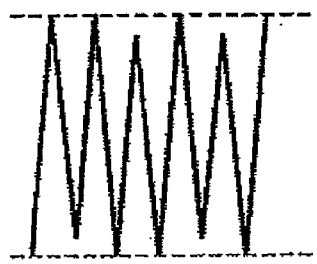
(b)
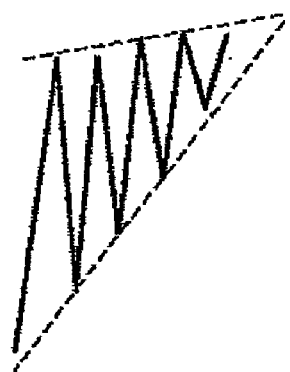
(e)
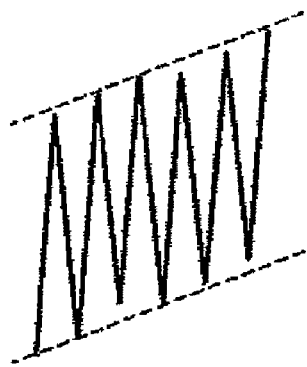
(c)
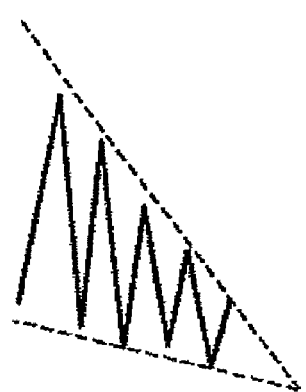
(f)
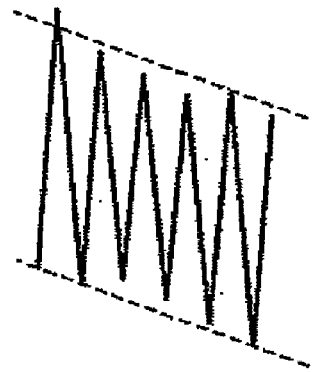

LINE SHAPE PROCESSING DEVICE, LINE SHAPE PROCESSING METHOD, INFORMATION RECORDING MEDIUM, AND PROGRAM

TECHNICAL FIELD

The present invention relates to a line shape processing device and a line shape processing method which are suitable for detecting the characteristic of the end portion of a line shape, and for determining the similarity degree of a line shape based on the detected characteristic, a computer-readable information recording medium which records a program for realizing the foregoing device and method through a computer, and such a program.

BACKGROUND ART

There have conventionally been proposed techniques for receiving, via a touch panel, a mouse, or the like, an instruction entry that designates, by means of two coordinate values (typically, x-coordinate and y-coordinate values), the position of a point within a predetermined two-dimensional region, and processing the entered coordinate values. For example, the literature identified below discloses one such technique.

Patent Literature 1: Unexamined Japanese Patent Application KOKAI Publication No. 2003-114760

[Patent Literature 1] discloses a technique for moving a mouse pointer, which enables precise moves of the pointer by controlling it to move by a travel distance per unit operation amount that is shorter than a travel distance per a unit operation amount. Meanwhile, techniques for drawing a curve of any kind on a screen by an entry of coordinate values via a touch panel or a mouse are also widely used.

It is common to draw a change in a stock price, a weight, or the like over time with a graph whose horizontal axis (X coordinate) represents a time and whose vertical axis (Y coordinate) represents a value at a time. According to line drawings, the position of a point included in a line is specified by a first coordinate value and a second coordinate value (in this example, corresponding to an X coordinate and a Y coordinate, respectively), and merely one second coordinate value Y is acquired with respect to the first coordinate value X in the form of an explicit function like y=f(x).

DISCLOSURE OF INVENTION

Problem to be Solved by the Invention

Accordingly, there is a strong demand for a technology which is suitable for classifying the shape of a line appropriately when a line shape is acquired, calculating the degree of similarity degree to a conventional line shape based on the classification result, presenting lines similar to an inputted line shape to a user, and allowing the user to select one.

The present invention has been made to overcome the foregoing problem, and it is an object of the present invention to provide a line shape processing device and a line shape processing method which are suitable for detecting the characteristic of the end portion of a line shape and for determining the similarity degree of a line shape based on the detected characteristic, a computer-readable information recording medium which stores a program for realizing the foregoing device and method, and such a program.

Means for Solving the Problem

To achieve the object, the present invention will be disclosed based on the principle thereof.

A line shape processing device according to the first aspect of the present invention processes a shape of a line having a position in a two-dimensional domain specified by a pair of a first coordinate value, which is a coordinate value in a first coordinate axis direction, and a second coordinate value, which is a coordinate value in a second coordinate axis direction different from the first coordinate axis direction, and comprises a coordinate storing unit and a detecting unit, and is structured as follows.

That is, the coordinate storing unit stores a first coordinate value of a point included in a line input by a user and only one second coordinate value of that point in association with the first coordinate value.

The coordinate storing unit is typically prepared in a RAM (Random Access Memory). A pair of a first coordinate value and a second coordinate value may be stored in such a way that there is no other pair having the same first coordinate value as that first coordinate value, and when a first coordinate value is expressed by an integer, by storing a second coordinate value in an array having an index which is a first coordinate value, only a second coordinate value input at last to the first coordinate value may be stored.

On the other hand, the detecting unit detects whether a shape of an end portion of the line input by the user is any one of the followings:

(a) a pennant shape where vibration amplitude becomes narrow while vibrating;

(b) a flag shape vibrating at a substantially constant vibration amplitude; or (c) a normal shape other than the shapes of (a) and (b) from the stored first coordinate value and second coordinate value of the point included in the line on the basis of a distribution of extreme values of the second coordinate value.

A pennant shape, a flag shape and the like are concepts widely used in stock price movement, because it is important to figure out which one of the shape the shape of the end portion of the line input by the user is, the detecting unit detects this. At this time, according to the present invention, the distribution of extreme values (local maximum or local minimum) of second coordinate values in a line shape are checked, thereby carrying out determination.

According to the present invention, it becomes possible for the user to figure out that the shape of the end portion of the line input by the user is any one of a pennant shape where vibration amplitude becomes narrow while vibrating, a flag shape vibrating at a substantially constant vibration amplitude, or a normal shape other than the foregoing shapes.

Moreover, the line shape processing device of the present invention can be structured as follows.

That is, the coordinate storing unit stores a first coordinate value of the point included in the line in association with only one second coordinate value of that point by taking a value of an element of an array, having a subscript that is a first coordinate value of the point included in the line, as a second coordinate value of that point.

As explained above, when a first coordinate value and a second coordinate value can be expressed by integers, by storing a second coordinate value in an array having a subscript which is a first coordinate value, it becomes possible to easily store pairs of coordinate values having no duplicated first coordinate value.

On the other hand, the detecting unit scans first coordinate values that are the subscript of the array in a direction from the maximum value of the first coordinate value to the minimum value thereof in regard to stored first coordinate value and second coordinate value of the point included in the line that is stored, compares a second coordinate value stored and associated right before the first coordinate value and a second coordinate value stored and associated right after the first coordinate value with a second coordinate value stored in association with the first coordinate value, detects respectively 2W (W≧1) number of coordinates of points where the second coordinate value becomes local maximum and coordinates of points where the second coordinate value becomes local minimum, and when 2W number of respective kinds of coordinates are detected, compares a difference between second coordinate values of W number of weighted centers detected in first among points which become local maximum and second coordinate values of W number of weighted centers detected in first among points which become local minimum with a difference between second coordinate values of W number of weighted centers detected later among points which become local maximum and second coordinate values of W number of weighted centers detected later among points which become local minimum, and detects the shape of the line as:

(a) a flag shape vibrating at a substantially constant vibration amplitude, if a difference at a starting side of the line and a difference at an ending side of the line is equal within a predetermined error range;

(b) a pennant shape where vibration amplitude becomes narrow while vibrating, if (a) is not satisfied and the difference at the ending side is larger than the difference at the starting side; or (c) a normal shape if (a) and (b) are not satisfied or 2W number of points where the second coordinate value becomes local maximum and points where the second coordinate value becomes local minimum are not detected respectively.

The present invention relates to the preferred embodiment of the present invention, and realizes a specific method to distinguish a flag shape, a pennant shape, and a normal shape.

According to the present invention, a line having a limitation particular to a shape that "there is no point having the same first coordinate value among points included in a line" can be naturally and efficiently stored, and "a point where a second coordinate value becomes local maximum or local minimum" can be easily and efficiently detected by scanning first coordinate values which are subscript of an array.

Moreover, the line shape processing device of the present invention may have an input receiving unit that receives a first-kind-instruction inputting which specifies a position of a point included in a line in a two-dimensional domain, and receive a second-kind-instruction inputting different from the first-kind-instruction inputting.

In particular, in the line shape processing device of the present invention, the input receiving unit may receive a depressing operation to a surface of a screen as the first-kind-instruction inputting which specifies a position in the two-dimensional domain associated with a portion which is subjected to the depressing operation, and receive a releasing operation from the screen as a second-kind-instruction inputting.

In processing a coordinate value of a line drawing having a time axis in a horizontal direction like a graph of stock price movement, it is typical that a Cartesian coordinate system is used as a coordinate system, a value of an X coordinate and a value of a Y coordinate are taken as a first coordinate value, a second coordinate value, respectively. However, depending on applications, an X coordinate and a Y coordinate can be swapped, or an oblique coordinate or a polar coordinate can be employed. For example, in drawing a circle graph, an angle and a radius can be employed as a first coordinate value and a second coordinate value, respectively.

When an input device which moves a mouse pointer in a screen as a mouse is moved is employed, it is typical that first-kind-instruction inputting which specify positions of the mouse pointer in the screen during a drag operation in which the mouse is moved with the button thereof being pressed are successively input.

In this case, during other operations, such as releasing the button of the mouse, and moving the mouse with the mouse button being released, second-kind-instruction inputting are successively input.

On the other hand, when an input device like a touch panel is used, it is typical that first-kind-instruction inputting which specify positions of points included in a trajectory during a period that a touch pen is moved with the touch panel being touched (being subjected to depressing operation) are successively input.

In this case, other operations, such as releasing the touch pen from the touch panel and the like are associated with second-kind-instruction inputting.

At this time, when reception of first-kind-instruction inputting are successively carried out, for each first coordinate value included in a range from a first coordinate value of a starting position specified by a previous first-kind-instruction inputting to a first coordinate value of an end position specified by a later first-kind-instruction inputting, a second coordinate value of a point included in a line, interconnecting the starting position and the end position, and having that first coordinate value can be stored in the coordinate storing unit in association with that first coordinate value.

When coordinates specified by a previous first-kind-instruction inputting are $(X_1, Y_1)$ and coordinates specified by a later first-kind-instruction inputting are $(X_2, Y_2)$, it is not always true that $X_1$ and $X_2$ lie next to each other (difference between $X_1$ and $X_2$ are 1), and let us suppose a line interconnecting $(X_1, Y_1)$ and $(X_2, Y_2)$. A position $(X, Y)$ of a point included in this line can be expressed as follow.

$$(X, (X_2-X) \cdot Y_1/(X_2-X_1) + (X-X_1) \cdot Y_2/(X_2-X_1))$$

Note that X presents between $X_1$ and $X_2$.

The X of (X, Y) acquired in this fashion is changed with an appropriate accuracy in such a way that:

(a) when $X_1 < X_2$, taking $X_1$ as the initial value of X, X is incremented by 1 until X reaches $X_2$;

(b) when $X_2 < X_1$, taking $X_1$ as the initial value of X, X is decremented by 1 until X reaches $X_2$;

(c) when $X_1 = X_2$, set $(X, Y) = (X_2, Y_2)$.

and for acquired (X, Y), Y is stored in the storing unit in association with X. At this time, if any second coordinate value for the same first coordinate value X is stored in past, it is overwritten and the most latest second coordinate value Y is always stored.

At this time, second coordinate values stored in association with first coordinate values in the coordinate storing unit are acquired in a predetermined order to the first coordinate values, and a point is drawn at a position in a screen associated with a position in a two-dimensional domain specified by a first coordinate value with which the acquired second coordinate value is associated, and the second coordinate value, thereby displaying a line shape in the two-dimensional domain.

When an X coordinate value and a Y coordinate value are employed as a first coordinate value and a second coordinate value, respectively, X coordinate values may be acquired in an ascending order to acquire Y coordinate values corresponding to respective X coordinate values, or X coordinate values may be acquired in a descending order to acquire Y coordinate values corresponding to respective X coordinate values.

When a point is drawn at (X, Y) acquired in the foregoing fashion, a line shape can be drawn by a dashed line (broken line), and the shape of such a line forms a graph which can be expressed as an explicit function like Y=f(X).

According to the present invention, two kinds of instruction inputting can be easily performed with simple operations, and the user can viscerally input a line shape using a first-kind-instruction inputting. In particular, when the user inputs coordinate values of a point included in a line drawing like a graph of an explicit function to process it, inputting of the user is facilitated.

Moreover, the line shape processing device of the present invention further has a deleting unit, and can be structured as follows.

That is, when a predetermined number of reception of the first-kind-instruction inputting are successively carried out, and for all pairs of adjoining first-kind-instruction inputting among successively carried out first-kind-instruction inputting, if an angle between a vector from a position specified by a pair of previous first-kind-instruction inputting to a position specified by a pair of later first-kind-instruction inputting and a vector in a direction in which only the first coordinate value is changed in a predetermined order in the two-dimensional domain is greater than or equal to a predetermined obtuse angle, the deleting unit deletes second coordinate values, stored in the coordinate storing unit in association with first coordinate values specified by each of successively carried out first-kind-instruction inputting within a range from the minimum value of a first coordinate value to a maximum value thereof, from the coordinate storing unit.

For example, when the first coordinate value is an X coordinate value in a horizontal direction, the second coordinate value is a Y coordinate value in a vertical direction, and the direction in which the X coordinate increases is a direction from left to right, a "vector in a direction in which only first coordinate value is changed in a predetermined order" is a vector from left to right. On the other hand, a vector from a previous position to a later position is a vector indicating a direction in which a touch pen or a mouse moves.

Therefore, when an angle between those vectors is greater than or equal to a predetermined obtuse angle, this means that the touch pen or the mouse is roughly moved from right to left.

That is, according to the present invention, when the touch pen or the mouse is roughly moved from left to right, a line shape for that movement segment is input, and when it is moved from right to left, a line shape in that movement segment is deleted.

For example, when a status of the touch pen is monitored at a predetermined interval, and an instruction inputting is obtained from this state, "predetermined number of first-kind-instruction inputting are successively carried out" corresponds to a case where the surface of the touch panel has been traced for greater than or equal to predetermined time by the touch pen.

Moreover, when an X coordinate is used as a first coordinate value and a point is drawn in an order that X increases, the "direction in which only first coordinate values are changed in a two-dimensional domain in a predetermined order" means a positive direction of the X axis.

Then, when coordinates in an order of time specified by M number of first-kind-instruction inputting successively carried out are $(X_1, Y_1), \ldots, (X_M, Y_M)$, for all of i=1, 2, ..., M−1, when a directional vector $(X_{i+1} - X_i, Y_{i+1} - Y_i)$ has an angle with the positive direction of the X axis which is greater than or equal to an obtuse angle θ, i.e., when $X_{i+1} < X_i$ and $|(Y_{i+1} - Y_i)/(X_{i+1} - X_i)| \leq \tan \theta$, deletion is carried out.

For example, when a line shape like a graph is drawn if the X axis is disposed in the horizontal direction of the screen and the positive direction of the X axis is from left to right, the user merely moves the touch pen from left to right as much as possible. At this time, even if an operation includes a little error and the touch pen slightly goes back from right to left, a line shape is decided in accordance with the history of movement of the touch pen.

However, when the touch pen is moved flat from right to left for greater than or equal to predetermined time, a portion of a line included in a range from an X coordinate of a starting position of the movement to an X coordinate of an end position thereof is deleted.

As a deletion method, when coordinate values are stored in a RAM, impossible coordinate values, such as coordinate values outside the two-dimensional domain may be stored, and when each second coordinate value is stored, flag information indicating whether or not the second coordinate value is deleted may be stored simultaneously.

According to the present invention, it becomes easy to edit a line shape, such as deletion of a portion of a line like an input graph to draw discontinuous line shape, and deletion of unnecessary segment.

According to the present invention, it becomes easy for the user to input a line shape and to delete a line shape already input with simple operations.

Moreover, in the line shape processing device, when the detecting unit detects that the shape of the end portion of the line is a pennant shape or a flag shape, the detecting unit compares a sum of second coordinate values of starting-side half of weighted centers of points which become local maximum and second coordinate values of starting-side half of weighted centers of points which become local minimum with a sum of second coordinate values of ending-side half of weighted centers of points which becomes local maximum and second coordinate values of ending-side half of weighted centers of points which becomes local minimum, and detects that the line shape is:

(p) flat if the sum at the starting side is equal to the sum at the ending side within a predetermined error range;

(q) uprising if (p) is not satisfied and the sum at the starting side is smaller than the sum at the ending side; or (r) falling if (p) and (q) are not satisfied.

The present invention relates to the preferred embodiment of the invention, and because it is extremely important to figure out whether the pennant shape or the flag shape is any one of uprising, falling, or flat in an analysis of a stock price movement, the detecting unit detects this. At this time, according to the present invention, an average of extreme values of first half part of the end portion of a line and an average of extreme values of second half part thereof are compared to carry out determination.

According to the present invention, it becomes possible for the user to figure out whether or not the end portion of a line input by the user is any one of uprising, falling, or flat.

Moreover, the line shape processing device of the present invention further has a candidate storing unit, a similarity extracting unit and a presenting unit, and can be structured as follows.

That is, the candidate storing unit stores, for each of shapes of plural lines prepared beforehand, a first coordinate value of a point included in a line, and a second coordinate value of that point in association with the first coordinate value of that point.

According to the foregoing example, a graph of stock price movement of each stock acquired from market conditions is prepared separately from a graph of stock price movement input by the user.

On the other hand, the similarity extracting unit calculates a similarity degree between each of the shapes of the plural lines stored in the candidate storing unit and a shape of a line stored in the coordinate storing unit, extracts a line having a small calculated similarity degree from the plural lines, wherein a similarity degree is a total sum of a value acquired by multiplying a square of a difference in second coordinate values of two lines subjected to similarity degree calculation at a same first coordinate value by a weighting factor determined based on whether the shapes of end portions of the two lines are a combination of a pennant shape, a flag shape, or a normal shape.

According to the foregoing example, a similarity is determined not by a differential square sum simply between a conventional stock price movement and a stock price movement input by the user, but by determining a weighting with respect to a differential square sum based on whether the shapes of end portions are any combination of a pennant shape, a flag shape or a normal shape. Accordingly, a similarity can be determined based on, in particular, the shape of an end portion that is considered as important by the user.

Further, the presenting unit presents the extracted line shape to a user.

As a line shape, various kinds can be thought, but for example, a graph which represents a value of a trade target, such as a product, a service, a certificate, or a credit obligation, e.g., stock price movement can be employed.

At this time, in the line shape processing device of the present invention, each of the plural lines prepared beforehand represents a change in a trade-target value over time associated with that line among plural trade targets, a shape of a line input by the user is a shape in which a change in a trade-target value over a time subjected to searching by the user is input from past to present, and the presenting unit presents the extracted line shape and information on a trade target associated with that line.

That is, a line shape having a similar shape to a line shape input by the user is extracted, and according to the foregoing example, as the user sees a presented line shape, the user can acquire information on a stock having a desired stock price movement.

Moreover, in the line processing device of the present invention, a first coordinate value is expressed by an integer, and when a first coordinate value of a point to be drawn adjoins next to a first coordinate value of a point drawn right before the foregoing point, a line interconnecting the point to be drawn and the point drawn right before the foregoing point is drawn.

The present invention relates to the preferred embodiment of the invention, and according to the invention, a graph corresponding to Y=f(X) is displayed as a dot sequence of points having an X coordinate value and a Y coordinate value, but according to an embodiment, when X coordinates of two points to be drawn are sufficiently close, e.g., when adjoins each other with a representational accuracy (dot unit) of a screen, by drawing a line between those two lines, a graph can be drawn as a line diagram.

Note that when X coordinates do not lie next to each other, a line is not drawn between two points, a graph having some segments of X coordinates of Y=f(X) where a Y coordinate is not defined can be drawn.

According to the present invention, it becomes easy to draw a line shape like a graph which appropriately interconnects positions of input points, and to display various kinds of graphs.

Moreover, the line shape processing device of the present invention further has a display unit, the coordinate storing unit stores a second coordinate value as an element of an array whose index is a first coordinate value, or a value indicating that a second coordinate value to be associated with a first coordinate value is deleted, and the display unit scans elements of the array in such a way that the index of the array changes in a predetermined order, acquires a second coordinate value associated with a first coordinate value, and displays a curved line which passes through a position specified by the first coordinate value and the second coordinate value.

In various information processing devices, a first coordinate value and a second coordinate value are input as integers, and when a size like width 320 times height 240 is employed as a predetermined area, possible second coordinate values are 240 numbers from 0 to 239, can be expressed by 1 bite, and possible first coordinate values are 320 numbers from 0 to 319, so that the size of entire array can be set to 320 bites. When 255 is stores as a value of an element of the array (i.e., second coordinate value), it is possible to process that no graph is drawn (points are deleted) at a first coordinate value which is an index of the element.

According to the present invention, a data structure which facilitates management of a second coordinate value stored at last to each first coordinate value as only one value is realized, thereby speeding up a process.

A line shape processing method according to another aspect of the present invention is for processing a shape of a line having a position in a two-dimensional domain specified by a pair of a first coordinate value, which is a coordinate value in a first coordinate axis direction, and a second coordinate value, which is a coordinate value in a second coordinate axis direction different from the first coordinate axis direction, and for using a coordinate storing unit that stores a first coordinate value of a point included in a line input by a user and only one second coordinate value of that point in association with the first coordinate value, and the method comprises an input receiving step, a storing step and a detection step, and structured as follows.

That is, in the input receiving step, an input receiving unit receives a first-kind-instruction inputting which specifies a position of a point included in a line in the two-dimensional domain, and a second-kind-instruction inputting different from the first-kind-instruction inputting.

On the other hand, in the storing step, when reception of first-kind-instruction inputting are successively carried out, for individual first coordinate values included in a range from a first coordinate value at a start position specified by a previous first-kind-instruction inputting to a first coordinate value at an end position specified by a later first-kind-instruction inputting, a storing unit stores a second coordinate value of a point, included in a line interconnecting the start position and the end position and having the first coordinate value, in association with the first coordinate value in the coordinate storing unit.

Further, in the detection step, a detecting unit detects that a shape of an end portion of a line input by the user is any one of the followings:

(a) a pennant shape where vibration amplitude becomes narrow while vibrating;

(b) a flag shape vibrating at a substantially constant vibration amplitude; or (c) a normal shape other than the shapes of (a) and (b) from the stored first coordinate value and second coordinate value of that point included in that line based on a distribution of extreme values of the second coordinate value.

A program according to other aspect of the present invention allows a computer to function as the foregoing line shape processing device, and allows the computer to execute the foregoing line shape processing method.

The program of the present invention can be recorded in a computer-readable information recording medium, such as a compact disk, a flexible disk, a hard disk, a magneto-optic disk, a digital video disk, a magnetic tape, and a semiconductor memory.

The foregoing program can be distributed and sold through a computer communication network, separately from a computer which executes the program. Moreover, the foregoing information recording medium can be distributed and sold separately from the computer.

Effect of the Invention

According to the present invention, there are provided a line shape processing device and a line shape processing method which are suitable for detecting the characteristic of the end portion of a line shape and for determining the similarity degree of a line shape based on the detected characteristic, a computer-readable information recording medium which stores a program for realizing the foregoing device and method, and such a program.

BRIEF DESCRIPTION OF DRAWINGS

FIG. 3 is a flowchart showing the control flow of a coordinate-value-input display process executed by the line shape processing device of the embodiment;

FIG. 4 is an explanatory diagram showing the trajectory of movement of a touch pen operated in a depressed manner and the shape of a graph line in response to that trajectory;

FIG. 7 is an explanatory diagram showing the shape of a line input when a user carries out an operation of moving a touch pen from right to left;

FIG. 8 is an explanatory diagram showing the shapes of a pennant and a flag;

Figure 1:
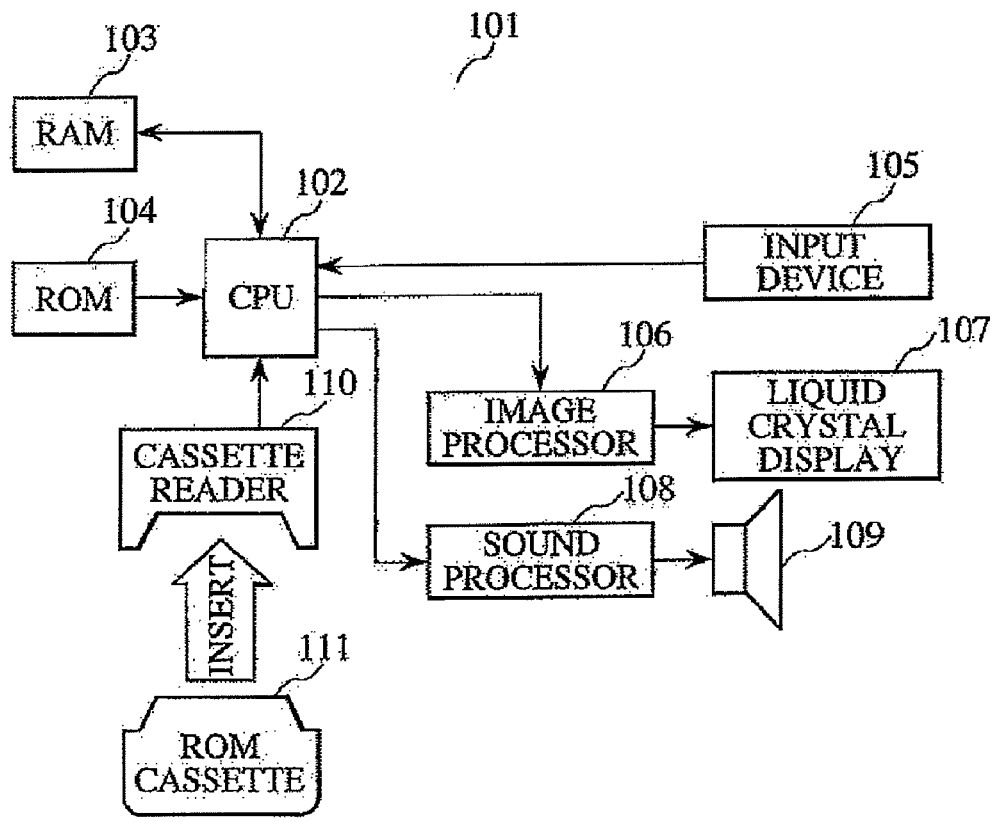
FIG. 1 is an explanatory diagram showing the general structure of a common information processing device which realizes the line shape processing device of the present invention.

EXPLANATION OF REFERENCE NUMERALS 101 information processing device
102 CPU
103 RAM
104 ROM
105 input device
106 image processor
107 liquid crystal display
108 sound processor
109 speaker
110 cassette reader
111 ROM cassette
201 line shape processing device
202 input receiving unit
203 coordinate storing unit
204 log storage unit
205 display unit
206 deleting unit
207 detecting unit
401 zigzag line
402 folded portion
403 graph line
404 straight line
405 graph line
601 erasing line
603 graph line
901 local maximum point
906 local minimum point
911 local maximum point
916 local minimum point
921 local maximum point
926 local minimum point
931 local maximum point
936 local minimum point
961 median point between older local maximum points
966 median point between older local minimum points
971 median point between latest local maximum points
976 median point between latest local minimum points
991 candidate storing unit
992 similarity extracting unit
993 presenting unit

BEST MODE FOR CARRYING OUT THE INVENTION

An embodiment of the present invention will be explained below. To facilitate understanding, an explanation will be given of the embodiment where the present invention is realized using a gaming information processing device, but the embodiment explained below is just for explanation, and is not for limiting the scope of the present invention. Accordingly, a person skilled in the art can carry out embodiments where each or all structural parts are replaced with equivalents, but it should be understood that such embodiments should be within the scope of the present invention.

First Embodiment

FIG. 1 is an explanatory diagram showing the general structure of a common information processing device which realizes a line shape processing device of the present invention. Hereinafter, an explanation will be given with reference to this diagram.

An information processing device 101 has a CPU (Central Processing Unit) 102, a RAM (Random Access Memory) 103, a ROM (Read Only Memory) 104, an input device 105, an image processor 106, a liquid crystal display 107, a sound processor 108, a speaker 109, and a cassette reader 110.

The CPU 102 controls individual units of the information processing device 101. The memory area of the RAM 103, the memory area of the ROM 104, and the memory area of a ROM cassette 111 loaded in the cassette reader 110 are all mapped to one memory space managed by the CPU 102, and by reading out an address where each memory area is mapped, the CPU 102 can acquire information stored in each memory area. Note that the memory area of the RAM 103 can accept writing, too.

In addition, registers which work as collaborators when the CPU 102 gives various kinds of instructions to the image processor 106 and the sound processor 108, and when information is acquired from the input device 105 are mapped in the memory areas, and an instruction can be made when data writing representing a command is performed on a predetermined address, and information can be acquired when data is read out from a predetermined address.

As the information processing device 101 is powered on, the CPU 102 executes a program started from an address where the memory area of the ROM cassette 111 loaded in the cassette reader 110 is mapped. The RAM 103 is used for various purposes as a temporal memory area. The ROM 104 records a BIOS (Basic Input/Output System) routine provided by the information processing device 101, and this can be appropriately called out from the program in the ROM cassette 111.

The input device 105 reflects inputting, from a button for receiving an instruction inputting representing a direction, and a button for receiving an instruction inputting distinguishing various operations, on registers mapped to a memory spaces, and receives an inputting indicating whether or not a touch panel attached on the surface of the liquid crystal display 107 is depressed, and an inputting indicating the coordinates of a depressed position when the touch panel is depressed.

The liquid crystal display 107 is managed by the image processor 106. A memory area for storing a tile mapped to a memory space, and a memory area for storing an object attribute memory are used. As the CPU 102 writes in a value generated by a calculation or transfers information appropriately from the ROM cassette 111 loaded in the cassette reader 110, the liquid crystal display 107 displays a sprite image.

In addition, a frame buffer which manages an image displayed on the liquid crystal display 107 pixel unit by pixel unit can be used, and when it is desirable to display a color at a position in the liquid crystal display 107, as a numeric value corresponding to this color is written in a position in the frame buffer corresponding to this position, the liquid crystal display 107 displays a bitmap image at an appropriate timing.

For example, in the case of 16-bit-color-display 320×200 dots liquid crystal display 107, a color of one pixel is expressed by two bites. Thus, an array having 320×200 elements (each two bites) is prepared as a frame buffer in the RAM 103, the elements of the array are associated with pixels of the liquid crystal display 107 one by one. a 16-bit value representing a color is written in the element of the array, and the image processor 106 performs control in such a way that the content of the frame buffer is reflected on the liquid crystal display 107 at an appropriate timing (e.g., at a period when a vertical synchronous interrupt occurs).

It is general that the number of the liquid crystal display 107 is set to one or plural number, and in the case of plural number, one liquid crystal display 107 may be used for displaying only, and another liquid crystal display 107 may be provided with a touch panel. In this case, as the touch panel is depressed and operated using a touch panel, coordinate values indicating the corresponding position of the liquid crystal display 107 are input.

Although the information processing device 101 is used as a typical portable game device, the technology of the present invention can be applied to various kinds of application programs running on a general purpose computer which performs input/output using a mouse, a keyboard, and a CRT (Cathode Ray Tube), and it should be understood that such an embodiment is included within the scope of the present invention.

(Basic Structure)

Figure 2:
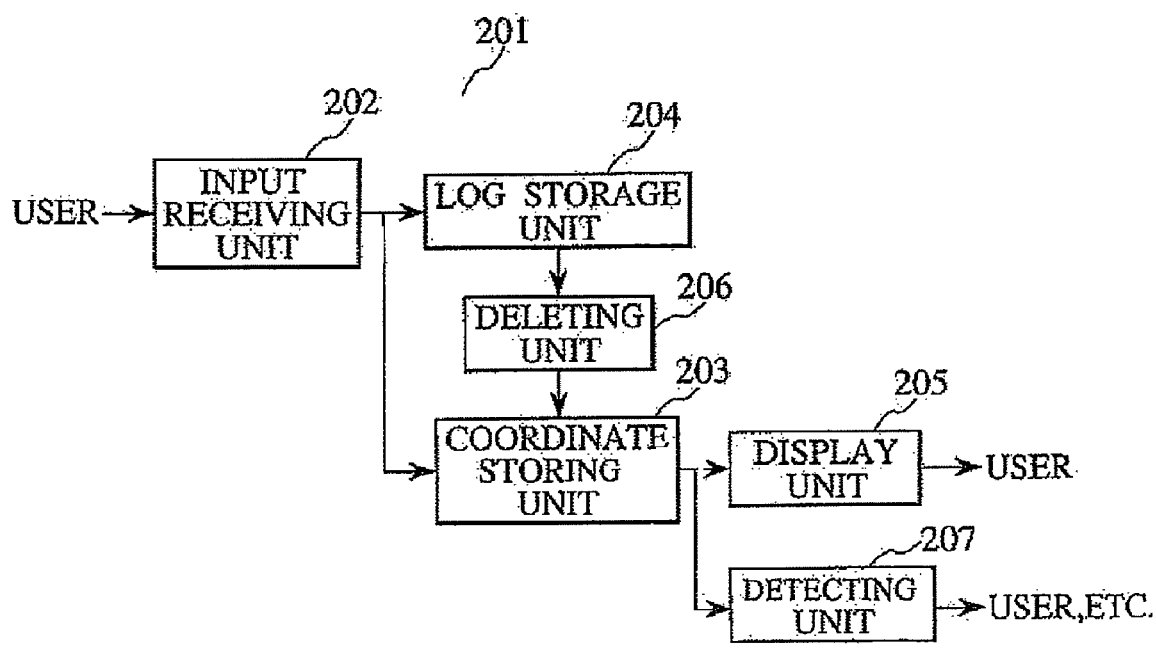
FIG. 2 is an explanatory diagram showing the general structure of the line shape processing device according to an embodiment.

FIG. 2 is an explanatory diagram showing the general structure of a line shape processing device of the embodiment. Hereinafter, an explanation will be given with reference to this diagram.

A line shape processing device 201 of the embodiment has an input receiving unit 202, a coordinate storing unit 203, a log storage unit 204, a display unit 205, a deleting unit 206, and a detecting unit 207.

The input receiving unit 202 is realized by a combination of a touch panel attached on the surface of the liquid crystal display 107 and a touch pen. As the CPU 102 checks the value of a predetermined register mapped to a memory space, information as to whether or not the touch panel is depressed and operated by the touch pen, or information as to whether or not the touch panel is released, and coordinates in the touch panel depressed and operated are acquired through a Cartesian coordinate when the touch panel is depressed and operated.

In the embodiment, let us suppose that a user wants to input the line drawing of a graph having a horizontal axis representing a time change and a vertical axis representing the value of a stock price, a weight, or the like. Accordingly, an X coordinate corresponds to a first coordinate value, and a Y coordinate corresponds to a second coordinate value, respectively. According to the foregoing example, possible X coordinate values are 0 to 319, and possible Y coordinate values are 0 to 239. Those values can be changed appropriately in accordance with the applied field and the specification of the information processing device 101.

On the other hand, the coordinate storing unit 203 stores a combination of an X coordinate value and a Y coordinate value of a point included in the line drawing of a graph, the log storage unit 204 stores a history of inputting of coordinate values, and those are realized by, typically, the RAM 103 under the control of the CPU 102.

The display unit 205 displays the line drawing of a graph, and is realized by the liquid crystal display 107 under the control of the CPU 102, and the deleting unit 206 appropriately manages information stored in the coordinate storing unit 203 and the log storage unit 204, and this is realized by the CPU 102 co-operating with the RAM 103.

Further, the detecting unit 207 detects whether or not a line shape stored in the coordinate storing unit 203 has a predetermined characteristic shape, and is realized by the CPU 102 co-operating with the RAM 103.

Note that processes using the log storage unit 204 and the deleting unit 206 and a process using the detecting unit 207 can be omitted depending on an applied field, and it should be understood that such omitted embodiments are included within the scope of the present invention.

FIG. 3 is a flowchart showing the control flow of a coordinate-value-input display process executed on the line shape processing device of the embodiment. Hereinafter, an explanation will be given with reference to this chart.

First, the CPU 102 initializes the coordinate storing unit 203 prepared in the RAM 103 (step S301), and initializes the log storage unit 204 (step S302).

The coordinate storing unit 203 is realized by a 320-bites array F. Hereinafter, an x-th element of the array F will be denoted as F[x]. In the embodiment, a newest second coordinate value Y with respect to a first coordinate value X is stored in an x-th element F[x] of the array F.

In the foregoing example, because the effective values as the second coordinate values are 0 to 239, a value 255 is used to express that "there is no second coordinate value Y corresponding to a first coordinate value X, and a graph is discontinuous at a position of the first coordinate value X".

Therefore, initialization of the coordinate storing unit 203 is carried out by executing a process of F[x]←255 in regard to X=0, 1, . . . 319. Here, "←" means substitution.

On the other hand, the log storage unit 204 is realized as a ring buffer which successively stores a predetermined number M of combinations of an X coordinate and a Y coordinate which are input most recently.

The ring buffer is realized by a variable number p which stores a place where a value should be registered at next, an array R having an element which is a structure of an X coordinate and a Y coordinate, and a variable number n which stores information on how many numbers of coordinate inputting indicating depressing operation are continuously carried out (corresponding to how much time continuously carried out) so far. The number of the elements of the array R is set to M. Hereinafter, an i-th element of the array R will be denoted as R[i], and the X coordinate of that element and the Y coordinate thereof will be denoted as R[i]·X, and R[i]·Y, respectively.

Accordingly, initialization of the log storage unit 204 can be realized by setting the values like p←0, n←0, and R[i]·X←−1, and R[i]·Y←255 in regard to i←0, 1, . . . , M−1.

After various variable number areas saved in the RAM 103 are initialized in this fashion, the CPU 102 refers to a predetermined register mapped to a memory space, and checks whether or not the touch panel attached to the liquid crystal display 107 is depressed and operated (step S303).

When it is depressed and operated (step S303: YES), a predetermined register mapped to a memory space is referred, and the X coordinate value a and the Y coordinate value b of a position where the touch panel attached to the surface of the liquid crystal display 107 is depressed and operated (step S304). That is, a first-kind-instruction inputting is received through the steps S303 to S304.

At this time, various kinds of conversion processes, such as a process of inverting a code and adding a constant value to reverse a direction, and a process of carrying out multiplication with an appropriate constant value to change the precision of a coordinate value to a desired precision may be performed on the X coordinate value a and the Y coordinate value b. In a case where a circular graph shape is drawn, it is typical that an angle corresponds to an X coordinate value, and a distance from the center corresponds to a Y coordinate value.

Thereafter, R[p]·X←a, R[p]·Y←b, and p←(p+1)mod M are executed, and acquired coordinate values are registered in the ring buffer of the log storage unit 204 (step S305). Here, X mod Y means a remainder of an integer X divided by a positive integer Y (remainder in a mathematical meaning, and $0 \leqq (X \bmod Y) \leqq Y-1$).

In a case where an input device which moves a mouse pointer in a screen by moving a mouse is employed, it is preferable that the positions of the mouse pointer in the screen should be successively input during a drag operation of moving the mouse pointer with a button of the mouse being pressed. Using information indicating whether or not a button of the mouse is pressed and information indicating the current position of the mouse pointer makes it possible to carry out the same processes as those from the step S303 to the step S304.

Further, n←n+1 is executed (step S306), and numbers indicating that depressing operation (first-kind-instruction inputting) has been continuously carried out so far are counted. The processes after the step S303 are executed at predetermined intervals as discussed later, so that the value of n may stand for a continuous time of the depressing operation so far.

Next, the CPU 102 determines whether or not a predetermined delete condition is satisfied (step S307). When the delete condition is satisfied, an input coordinate value will be appropriately deleted, but the detail of this operation will be discussed later. Moreover, as explained above, an embodiment of progressing the flow directly from the step S306 to the step S307 regardless of the delete condition can be employed. Here, an explanation will be given of the case where the delete condition is not satisfied (step S307: NO).

When the delete condition is not satisfied (step S307: NO), the CPU 102 determines whether or not a depressing operation (first-kind-instruction inputting) is continuously carried out, i.e., whether or not $n \geqq 2$ is satisfied (step S308).

When it is not satisfied (step S308: NO), i.e., when a first-kind-instruction inputting is carried out following to a second-kind-instruction inputting, in other words, when it is detected that a touch pen apart from the touch panel touches the touch panel, F[a]←b is executed (step S330), information on coordinates where depressed is registered, and the flow goes to step S319. That is, the step S330 corresponds to beginning of the correction of a line shape input in past time.

On the other hand, when it is satisfied (step S308: YES), coordinates specified by the newest first-kind-instruction inputting are:

$(X_1, Y_1) = (R[(p-1) \bmod M] \cdot X, R[(p-1) \bmod M] \cdot Y)$, and the coordinates specified by the last first-kind-instruction inputting are:

$(X_2, Y_2) = (R[(p-2) \bmod M] \cdot X, R[(p-2) \bmod M] \cdot Y)$, and those coordinate values are thus acquired (step S309).

Thereafter, it is determined whether or not $X_1 = X_2$ (step S310), and if so (step S310: YES), $F[X_2] \leftarrow Y_2$ is executed (step S311), and a second coordinate value $Y_2$ which is input with respect to a first coordinate value $X_2$ most recently is registered in the coordinate storing unit 203 as a point where the line of a desirable shape passes through.

On the other hand, when $X_1 \neq X_2$ (step S310: NO), s←sgn$(X_2 - X_1)$ is executed with respected to a variable number area s prepared in the RAM 103 (step S312). Here, sgn(z) is a function which returns 1 when z is positive, and returns −1 when z is negative.

The initial value of the variable number area X prepared in the RAM 103 is set to $X_1$ (step S313), and the following processes are repeated (step S314). That is, with respect to a variable number area Y prepared in the RAM 103, $Y \leftarrow (X_2 - X) \cdot Y_1/(X_2 - X_1) + (X - X_1) \cdot Y_2/(X_2 - X_1)$ is executed (step S315), and the value of a second coordinate value Y when the first coordinate value X of a line interconnecting $(X_1, Y_1)$ and $(X_2, Y_2)$ is acquired.

Thereafter, F[X]←Y is executed (step S316), and a second coordinate value Y input most recently with respect to a first coordinate value X is registered in the coordinate storing unit 203 as a point where the line of a desirable shape passes through.

Subsequently, X←X+S is executed (step S317), while X≠X$_2$, the processes from the step S314 to the step S318 are repeated (step S318).

When the repeating completes, the CPU 102 repeats the following processes while incrementing the value of i for i=0, 1, ..., 319 by 1 (step S319).

First, it is checked whether or not F[i] is a valid Y coordinate value (step S320). That is, in the embodiment, it is checked whether or not 0≦F[i]≦239 is satisfied. When F[i] is a valid Y coordinate value (step S320: YES), information for drawing a point at a position, corresponding to coordinates (i, F[i]), of the frame buffer storing information corresponding to individual pixels of the two-dimensional plane of the liquid crystal display 107 is written in (step S321). On the other hand, if not so (step S320: NO), drawing of a point is not carried out, and the flow goes to step S322.

By repeating the processes from the step S319 to the step S322 (step S322), points whose positions are detected among positions traced by the touch pen are displayed on the screen.

Further, the CPU 102 repeats the following processes while incrementing the value of i for i=0, 1, ..., 318 by 1 (step S323).

That is, it is checked whether or not both F[i] and F[i+1] are valid Y coordinate values (step S324). The determination criterion is the same as that of the step S319. When both values are valid Y coordinate values (step S324: YES), information for drawing a line from coordinates (i, F[i]) to coordinates (i+1, F[i+1]) is written in the frame buffer (step S325). In regard to the line drawing process with respect to such a frame buffer, the Bresenham's line drawing algorithm may be employed, or the image processor 106 itself may have such a function.

If not so (step S324: NO), line drawing is not carried out, and the flow goes to step S326.

By repeating the processes from the step S323 to the step S326 (step S326), a line interconnecting points whose positions are detected among positions traced by the touch pen is also displayed on the screen.

Thereafter, it becomes a standby state until a vertical synchronous interruption occurs (step S327). During this standby state, another process may be executed like a co-routine. When a vertical synchronous interruption occurs, the CPU 102 gives an instruction to the image processor 106 to reflect the content of the frame buffer on the liquid crystal display 107 and to display points at positions corresponding to coordinates input using the touch pen, and appropriately displays a line interconnecting those points (step S328). Thereafter, the flow returns to the step S303.

On the other hand, when a depressing operation by the touch pen is not performed and the touch pen is apart from the touch panel (step S303: NO), n←0 is set, and this is stored (step S329), and then the flow goes to step S319. This means that a second-kind-instruction inputting is received.

An explanation will now be given of what line shape of a graph is drawn from the trajectory of points input by the touch pen through such processes.

FIG. 4 is an explanatory diagram showing the trajectory of movement of the touch pen subjected to a depressing operation and the line shape of a graph displayed in response to that trajectory. Hereinafter, an explanation will be given with reference to this diagram.

In FIG. 4(a), a trajectory that a user draws a line snaking up and down in a zigzag manner by the touch pen is shown. The shape of a zigzag line 401 is the line shape of a graph which represents situations like stock price movement over time called pennants or flags frequently occurring at a short period in the time change of a stock price. Because the time change occurs from left to right, the trajectory of the zigzag line 401 generally moves from left to right, overall.

Here, in a case where the user draws the zigzag line 401 while moving the touch pen subjected to a depressing operation, it is not always true that the touch pen moves from left to right, and sometimes moves and returns from right to left. This particularly happens when the touch pen is rapidly moved. When such a backward movement occurs, plural Y coordinate values of the zigzag line 401 with respect to an X coordinate becomes present. In this figure, there are several folded portions 402.

In FIG. 4(b), the shape of a graph line 403 actually input when the zigzag line 401 including the folded portions 402 is drawn by the touch pen is shown.

As explained above, in the embodiment, a value (vertical axis) at a certain time point (horizontal axis) is set to only one value, and in a case where there are plural values at a certain time point, a value input at last is accepted. Therefore, even if the line goes backwardly from right to left, the touch pen then moves from left to right, and a latest trajectory will be accepted as the graph line 403.

FIG. 4(c) shows the trajectory of movement of the touch pen when the user wants to move the touch pen flat (parallel to the X axis) instead of a zigzag part of the zigzag line 401 shown in FIG. 4(a). After the zigzag line 401 shown in this figure is drawn, a flat lien 404 is drawn from left to right by the touch pen.

By carrying out such an operation, in regard to the value of a Y coordinate with respect to a certain X coordinate, one which is input at last becomes valid. FIG. 4(d) shows the shape of a graph line 405 actually to be input, and a portion where the user wants to make it flat is reflected.

Note that in a case where a delete condition to be discussed later is not adopted, a portion desired to be flat is reflected no matter whether the touch pen is moved from right to left along the straight line 404 in such a manner as to depress the touch panel or moved from left to right.

Figure 5:
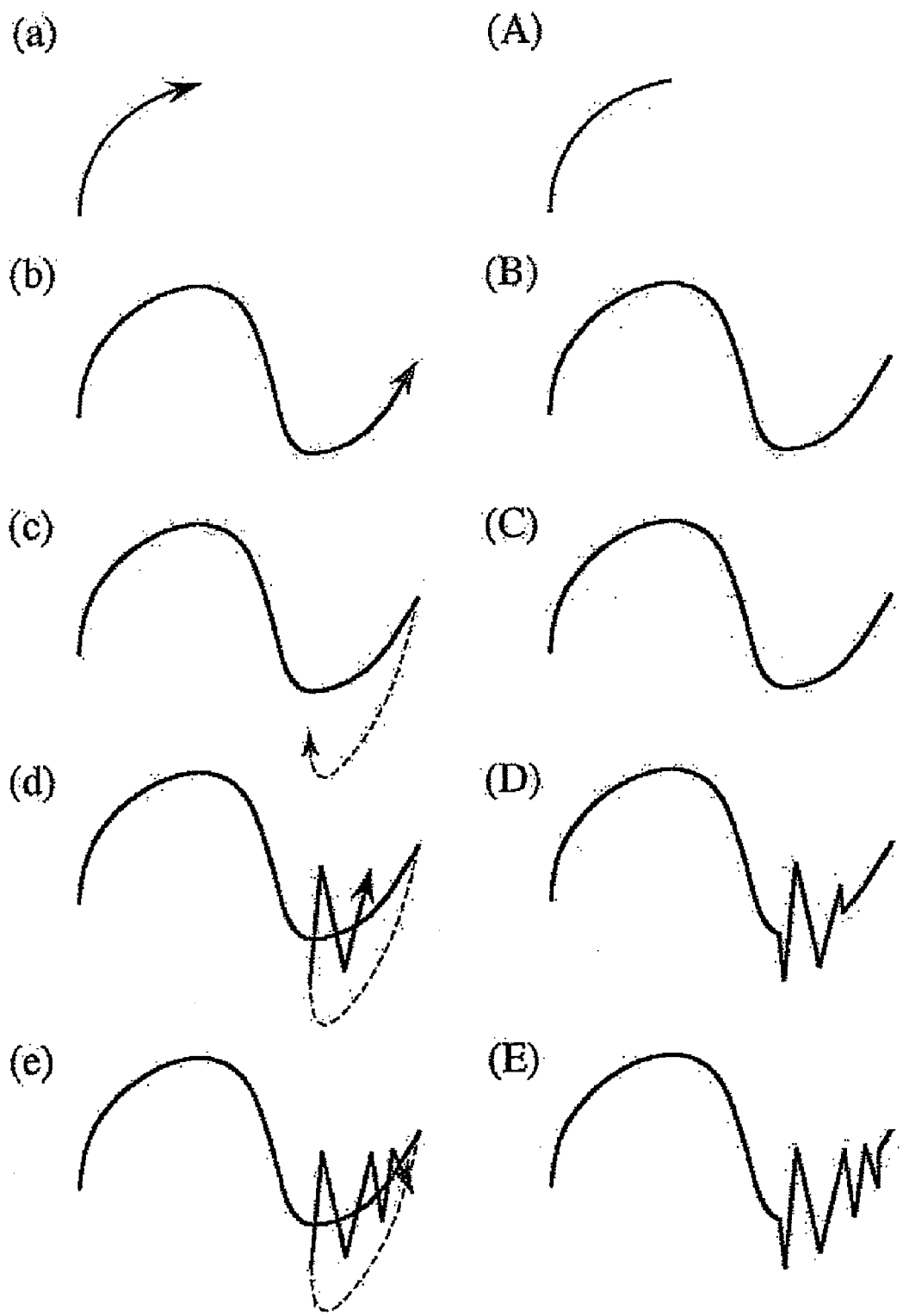
FIG. 5 is an explanatory diagram showing the relationship between the trajectory of movement of a touch pen and the shape of a line displayed on a screen.

FIG. 5 is an explanatory diagram showing the relationship between the trajectory of movement of the touch pen and a line shape displayed on the screen. Hereinafter, an explanation will be given with reference to this diagram.

FIGS. 5(a) to 5(e) show the way the touch pen moves in a time series order, an arrow represents the direction in which the touch pen moves, an actual line represents that the touch pen moves while depressing the touch panel, and a broken line represents that the touch pen is released from the touch panel and then moved.

On the other hand, FIGS. 5(A) to 5(E) correspond to FIGS. 5(a) to 5(e), and show the shape of a line displayed on the screen at individual time points in the time series order.

As shown in FIG. 5(a), when the touch pen is generally moved from left to right in a depressed manner, as shown in FIG. 5(A), a line shape which is the same as the trajectory of the touch pen is drawn. The same is true for FIG. 5(b) and FIG. 5(B).

Thereafter, as shown in FIG. 5(c), the touch pen is released from the touch panel, and is moved. At this time, because the touch pen is released, no first-kind-instruction inputting is performed, a line shape to be displayed on the screen becomes the same as FIG. 5(B) and FIG. 5(C).

For example, the line shape shown in FIG. 5(B) has an inverted S-shaped curve, and let us suppose that the user wants to make the end portion thereof to be in a pennant-like shape. In the embodiment, as shown in FIG. 5(d), it is just fine to draw a zigzag line while moving the touch pen from right to left. FIG. 5(D) is an display example on the halfway that the zigzag line is being drawn, and the shape of the graph line is a continuous line.

FIG. 5(e) shows the way the zigzag line is continuously drawn. In response to this, as shown in FIG. 5(E), a continuous line shape is displayed on the screen.

As explained above, according to the embodiment, when a graph shape is roughly drawn (FIGS. 5(a) and (b)) and then the user wants to correct a portion thereof to a zigzag line, by just simply drawing a zigzag line in the segment of that portion (FIGS. 5(d) and (e)), a continuous graph can be obtained. At this time, it is not necessary to put the start point of the zigzag line and the end point thereof on the line roughly drawn previously, so that it is easy for the user to do correction.

According to the embodiment, coordinate values of a line drawing like a graph having a horizontal axis as a time axis are processed, so that a Cartesian coordinate system is employed as a coordinate system, and the value of an X coordinate and the value of a Y coordinate are used as a first coordinate value and a second coordinate value, respectively, but depending on a use application, the X coordinate and the Y coordinate may be interchanged, and an oblique coordinate or a polar coordinate may be employed. For example, in the case of drawing a circular graph, an angle can be adopted as a first coordinate value, and a radius can be adopted as a second coordinate value.

As explained above, when a graph is input in an oblique coordinate or a polar coordinate, because coordinate axes are not orthogonal or are curved lines, a user inputting is likely to be vibrated, but when the present invention is applied, such a vibration is appropriately corrected, and it becomes possible to obtain the coordinate values of a graph which is close to a shape that the user wants to acquire.

(Delete Condition)

As explained above, drawing of a graph line drawing or correction thereof can be sufficiently performed when the delete condition is not satisfied, but the user wants to delete a portion of a graph in some cases. That is, a case where the user wants to draw a broken line drawing corresponds to this occasion. Moreover, there is often a demand to draw a new desired graph once unnecessary graph is erased. Accordingly, an explanation will be given of a technology of erasing a portion of a graph line drawing with simple operations.

As explained above, in drawing a graph, the touch pen subjected to a depressing operation is moved from left to right. Accordingly, in the embodiment, when the user wants to erase a graph, the touch pen subjected to depressing operation is moved from right to left within a range where the user wants to erase.

However, in drawing a zigzag line, as explained above, the touch pen may move from right to left for a quick moment.

To distinguish such an operation, when the touch pen is moved approximately flat from right to left for a certain period, a graph is erased, but if not so, even if the tough pen is moved from right to left, it is interpreted that such an operation is a normal inputting operation of coordinate values. The determination criterion for this is the delete condition.

In the embodiment, "M×vertical synchronous interruption period" corresponds to the "certain period". That is, when the touch pen is moved substantially flat from right to left during the "M×vertical synchronous interruption period", a range of movement from right to left in a line shape is merely deleted.

In the embodiment, using the ring buffer, it is detected whether or not the delete condition "the touch pen is moved substantially horizontally from right to left during M×vertical synchronous interruption period" is satisfied as follow.

Figure 6:
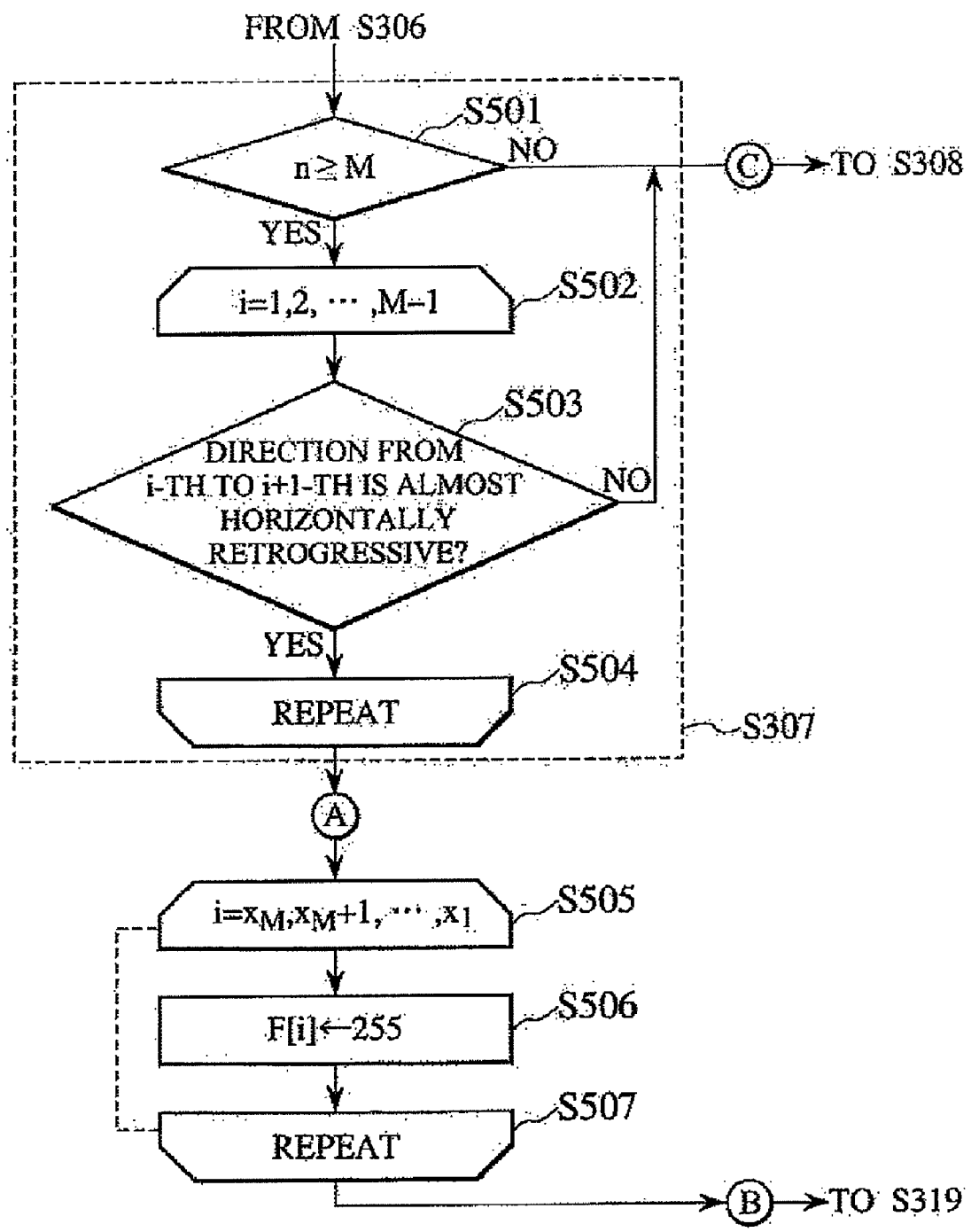
FIG. 6 is a flowchart showing the detailed control flow of a process which determines whether or not a delete condition is satisfied and is executed when satisfied.

FIG. 6 is a flowchart showing the step S307 of determining whether or not the delete condition is satisfied, and the detailed control flow of a process executed when it is satisfied. Hereinafter, an explanation will be given with reference to this flowchart.

As the process is started, first, it is determined whether or not n≧M (step S501). When n<M (step S501: NO), the process is terminated and the flow goes to the step S308.

On the other hand, when n≧M (step S501: YES), within the ring buffer, the history of coordinates of movement of the touch pen during M×vertical synchronous interruption period up to now is stored in the ring buffer in order of time as:

$(X_1, Y_1) = (R[(p-M) \bmod M] \cdot X, R[(p-M) \bmod M] \cdot Y)$, $(X_2, Y_2) = (R[(p-M+1) \bmod M] \cdot X, R[(p-M+1) \bmod M] \cdot Y)$,

. . . , $(X_i, Y_i) = (R[(p-M-1+i) \bmod M] \cdot X, R[(p-M-1+i) \bmod M] \cdot Y)$,

. . . , $(X_M, Y_M) = (R[(p-1) \bmod M] \cdot X, R[(p-1) \bmod M] \cdot Y)$.

Using a predetermined obtuse angle θ (typically, within a range from 170 degree to 180 degree), when an angle between the direction of the X axis and the direction in which the touch pen is moved is greater than or equal to this obtuse angle θ, it is determined that the touch pen is moved flat.

In regard to i=1, 2, . . . , M−1, the following processes are repeated while changing i (step S502).

First, it is determined whether or not $X_{i+1} < X_i$ and $|(Y_{i+1} - Y_i)/(X_{i+1} - X_i)| \leq \tan \theta$, i.e., whether or not the directional vector of movement of the touch pen in regard to from i-th history to i+1th history $(X_{i+1} - X_i, Y_{i+1} - Y_i)$ has an angle greater than or equal to the obtuse angle θ with respect to the positive direction of the X axis and the touch pen is moved inversely in the horizontal direction (step S503).

When this condition is not satisfied (step S503: NO), this process is terminated, and the flow goes to the step S308. On the other hand, if this condition is satisfied (step S503: YES), the processes from the step S502 to step S504 are repeated.

When the foregoing condition is satisfied for all of i=1, 2, . . . , M−1, then the delete condition is satisfied, and the flow goes to step S505.

When the delete condition is satisfied, $X_M < X_{M-1} < \ldots < X_2 < X_1$ is satisfied, so that the maximum value of a latest X coordinate in M number of the histories is $X_1$, and the minimum value of an X coordinate is $X_M$.

Therefore, in regard to each of i=$X_M, X_M+1, \ldots, X_1-1, X_1$, the following processes are repeated (step S505).

That is, at the coordinate storing unit 203,
execution of F[i]=255 (step S506)
is repeated (step S507).

A segment whose X coordinate is greater than or equal to $X_M$ and less than or equal to $X_1$ is eliminated from a line shape by the foregoing processes, and the line becomes discontinuous in many cases.

When repeating (step S505 to step S507) completes, this process is terminated, and the flow goes to the step S319.

FIG. 7 is an explanatory diagram showing a line shape input when the user performs an operation of moving the touch pen from right to left. Hereinafter, an explanation will be given with reference to this diagram.

FIG. 7(a) shows the pathway of movement of the touch pen by the user. This is the "history of depressing operation pathway" that the touch pen is released from the touch panel after the touch panel is depressed by the touch pen which has moved along a zigzag line 401 like one shown in FIG. 4, once stopped, and then moved from right to left along an approximately flat erase instruction line 601 while depressing the touch panel, and released.

FIG. 7(b) shows the "screen display example" of the shape of a graph line 403 displayed by the line shape processing device right after the touch panel is depressed by the touch pen which has moved along the zigzag line 401. The same shape as that of FIG. 4(b) is shown. As an example, this figure shows the shape of the graph line 403 corresponding to the zigzag line 401 which is the history that the user traces the touch panel by the touch pen.

FIG. 7(c) shows the "screen display example" of the shape of a graph line 603 displayed by the line shape processing device right after the touch panel is depressed by the touch pen which has moved along an erase instruction line 601 after the situation in FIG. 7(b). As shown in this figure, the shape of the graph line 603 becomes discontinuous.

This is because when the touch pen is moved flat along the erase instruction line 601 continuously for a certain amount of time while depressing the touch panel, the horizontal range of a segment where the touch pen is moved is deleted from the shape of the graph line 403.

As explained above, according to the embodiment, a segment can be deleted from a line shape with simple operations, so that the user can easily correct and edit the line shape.

(Various Processes for Coordinate Values)

Hereinafter, an explanation will be given of a technology of detecting a line shape when in particular a change in a stock price is exhibited. This technology can be applied to detect the characteristic of a change in a stock price when a line shape input through the foregoing technology can be considered as a graph showing a time change in a stock price.

Examples of the characteristic shape of a change in a stock price are called pennant and flag. FIG. 8 is an explanatory diagram showing the shapes of a pennant and a flag. Hereinafter, an explanation will be given with reference to this diagram.

FIGS. 8 (a), (b), and (c) show the shapes called pennant, price movement is large at first, but gradually converges as time advances. That is, this is a shape that the price vibrates (in a zigzag manner) but the vibration amplitude gradually becomes narrow. Further, when the average price is almost constant, the shape is simply called "pennant" or "flat pennant" (see FIG. 8(a)), when the price goes up, the shape is called "uprising pennant" (see FIG. 8(b)), and when the price falls down, the shape is called "falling pennant" (see FIG. 8(c)).

On the other hand, FIGS. 8(d), (e), and (f) show the shapes called flag, and this is a shape that almost same vibration amplitude of price movement is maintained. That is, this is a shape that a price vibrates (in a zigzag manner) with almost constant vibration amplitude. Further, when the average value is almost constant, the shape is simply called "flag" or "flat flag" (see FIG. 8(d)), when the price goes up, the shape is called "uprising flag" (see FIG. 8(e)), and when the price falls down, the shape is called "falling flag" (see FIG. 8(f)).

In regard to stock price movement, most recent pennant and flag are important. Therefore, in detecting a pennant and a flag, it is necessary to detect whether or not such a pennant or a flag presents in the vicinity of the end portion of a graph (according to the foregoing embodiment, whether or not such a shape is formed at a portion where an X coordinate is maximum).

According to the foregoing embodiment, a line shape is stored in the array F of the coordinate storing unit 203. Accordingly, by checking the content of the array F, it is possible to detect a pennant or a flag. Hereinafter, an explanation will be given of the detail of a process for this detection.

Figure 9:
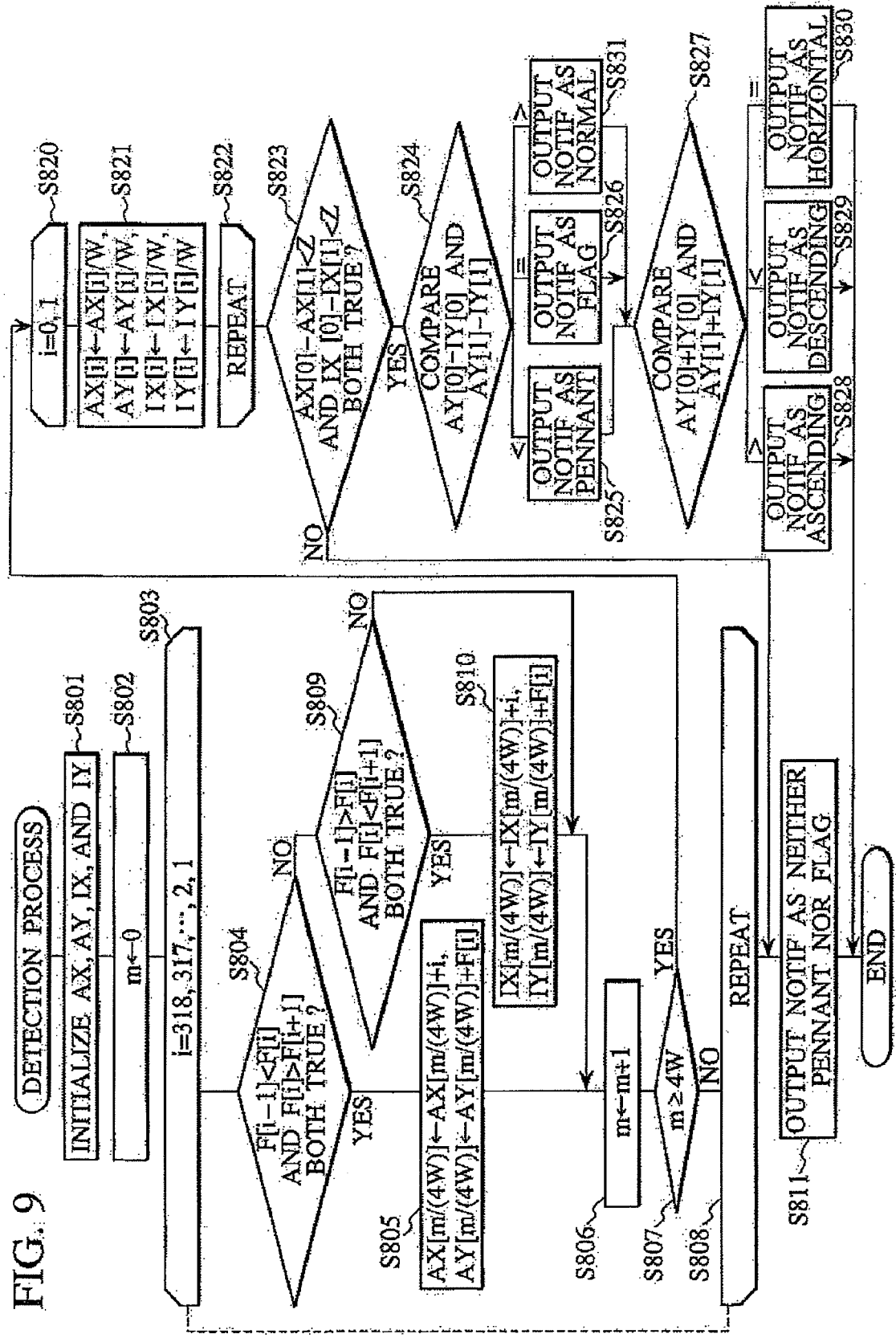
FIG. 9 is a flowchart showing the control flow of a detection process of detecting whether or not a line shape includes a pennant or flag shape.

In the embodiment, a pennant or a flag is checked based on the local maximum point of a line shape, the local minimum point thereof and the spread of an X coordinate at that time point. FIG. 9 is a flowchart showing the control flow of a detection process of detecting whether or not a line shape includes a pennant or a flag. Hereinafter, an explanation will be given with reference to this flowchart.

In this process, the following constant number and temporal variable number are used.

A constant number W is used for extracting 2 by W number of local maximum points, and 2 by W number of local minimum points.

Arrays AX and AY each having two elements are used for storing a partial sum of the X coordinate value of a local maximum point and the Y coordinate value thereof and an average, divided into first half and second half.

Arrays IX and IY each having two elements are used for storing a partial sum of the X coordinate value of a local minimum point and the Y coordinate value thereof, and an average, divided into first half and second half.

A threshold constant number Z is used for assuming that the spread of X coordinate values among 2W number of local maximum points and local minimum points corresponds to a pennant or a flag. When a spread of X coordinates is less than or equal to Z, this means that a price greatly goes up and down, and it is assumed that there is a pennant or a flag, but if not so, a price gently goes up and down, and it is assumed that there is no pennant or flag.

As the process starts, the CPU 102 accesses the RAM 103, and initializes the arrays AX, AY, IX, and IY (step S801). More specifically, in regard to i=0, 1, respectively, AX[i]←0, AY[i]←0, IX[i]←0, IY[i]←0 are executed.

Next, a variable number m for counting the numbers of local maximum points and local minimum points both detected so far are initialized (step S802). More specifically, m←0 is executed.

Further, in regard to i=318, 317, . . . , 2, 1, the following processes are repeated while decrementing the value of i by 1 (step S803).

First, it is determined whether or not F[i−1]<F[i] and F[i]>F[i+1], i.e., whether or not a point is a local maximum point (step S804). If so (step S804: YES), AX[m/(4W)]←AX[m/(4w)]+i, AY[m/(4W)]←AY[m/(4w)]+F[i] is executed (step S805), the X coordinate value of a local maximum point and the Y coordinate value thereof are integrated. Note that [a/b] means an integer division (division discarding a remainder) that a is divided by b.

Thereafter, m←m+1 is executed (step S806), and if m≦4W (step S807: YES), the flow goes out from this repeating and goes to step S820, and if not so (step S807: NO), the flow goes to next repeating (step S808).

On the other hand, if a point is not a local maximum point (step S804: NO), it is determined whether or not F[i−1]>F[i] and F[i]<F[i+1], i.e., whether or not a point is a local minimum point (step S809). If so (step S809: YES), IX[m/(4W)]←IX[m/(4w)]+i, IY[m/(4W)]←IY[m/(4w)]+F[i] are executed (step S810), the X coordinate value of a local minimum point and the Y coordinate value thereof are integrated. Thereafter, the flow goes to the step S806.

When the repeating (step S803 to step S808) simply completes, this means that the total numbers of detected local maximum points and local minimum points are not large, and the line shape processing device outputs a result to the effect that the line shape is not a pennant or a flag (step S811), and terminates the process. As an output destination, the output may be processed in another function unit as information storing place in the RAM 103, or the output may be presented to the user.

On the other hand, when the flow goes out halfway from the repeating (step S807: YES), in regard to i=0, 1, respectively, the following processes are repeated (step S820). That is, AX[i]←AX[i]/W, AY[i]←AY[i]/W, IX[i]←IX[i]/W, IY[i]←IY[i]/W are executed (step S821), and repeating is carried out (step S822).

In the repeating from the step S803 to the step S808, the value of i is decremented by 1, but the value of m is incremented by 1. and for an element having small subscript of AX, AY, IX, and IY, information on a side where the value of i is large in a graph (right side, i.e., most recent side) is stored, and for an element having large subscript of AX, AY, IX and IY, information on a side where the value of i is small in a graph (right side, i.e., past side) is stored. Therefore, after the step S822, (AX[0], AY[0]) . . . Average of most recent local maximum points (weighted center)

(AX[1], AY[1]) . . . Average of past local maximum points (weighted center)

(IX[0], IY[0]) . . . Average of most recent local minimum points (weighted center)

(IX[1], IY[1]) . . . Average of past local minimum points (weighted center)

Figure 10:
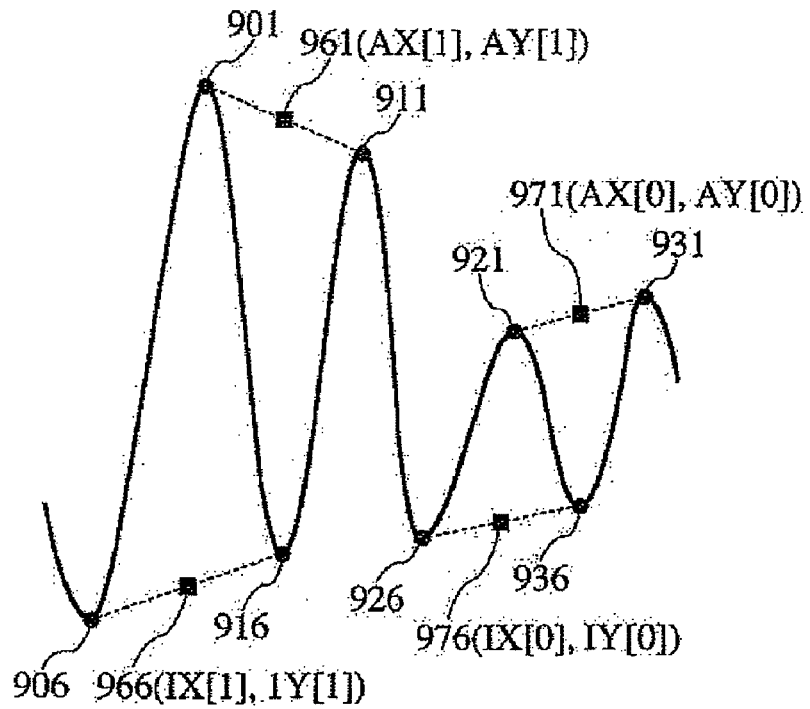
FIG. 10 is an explanatory diagram showing the relationship among the positions of a local maximum point, a local minimum point, and a weighted center.

FIG. 10 is an explanatory diagram showing the relationship among a local maximum point, a local minimum point, and positions of individual weighted centers. This figure corresponds to a case where W=2. Hereinafter, an explanation will be given with reference to this diagram.

As shown in the figure, local maximum points 931, 921, 911, and 901, and local minimum points 936, 926, 916, and 906 are detected from recent to past.

In drawing a graph in chronological order, it is general that the graph is drawn with times advancing from left to right, so that the right side of the screen is "recent", and the left side of the screen is "past".

A weighted center 961 of past local maximum points is a midpoint between the local maximum points 901 and 911, a weighted center 966 of recent local maximum points is a midpoint between the local maximum points 921 and 931, a weighted center 966 of past local minimum points is a midpoint between the local maximum points 906 and 916, and a weighted center 976 of recent local minimum points is a midpoint between the local maximum points 926 and 936.

Based on positional relationships among those weighted centers 961, 966, 971 and 976, it is determined whether or not a shape is a pennant or a flag, whether or not a shape uprises, falls down, or is flat.

First, it is checked whether or not AX[0]−AX[1]<Z and IX[0]−IX[1]<Z (step S823). If not so (step S823: NO), this means that a time change of price movement is not large, and the flow goes to step S811.

On the other hand, if so (step S823: YES), AY[0]−IY[0] is compared with AY[1]−IY[1] (step S824). If the former is smaller than the latter (step S824: <), the line shape processing device outputs a result to the effect that it is a "pennant" (step S825), if the former is (almost) same as the latter (step S824: =), the device outputs a result to the effect that it is a "flag" (step S826), and if the former is larger than the latter (step S824: >), the device outputs a result to the effect that it is "normal" (step S831). Here, a word "normal" means that a shape is not a "pennant" or a "flag".

Further, AY[0]+IY[0] is compared with AY[1]+IY[1] (step S827). If the former is larger than the latter (step S827: >), the device outputs a result to the effect that it is "uprising" (step S828), if the former is smaller than the latter (step S827: <), the device outputs a result to the effect that it is "falling" (step S829), and if the former is (almost) same as the latter (step S827: =), the device outputs a result to the effect that it is "flat" (step S830), and then the process is terminated.

In both comparisons in the steps S824 and S827, in considering a predetermined error, it is typical that a determination is given as "(almost) equal" when two values are within an error range.

Moreover, in the embodiment, the flow goes to the step S827 after the device outputs a result to the effect that it is "normal" in the step S831, but instead of this flow, the flow may go to the step S811 from the step S831, and no determination for "uprising", "falling", and "flat" may be carried out when the determination result is "normal".

According to the foregoing process, it becomes possible to detect the shape of a line used for expressing, in particular, a price movement of a stock.

(Similarity Degree of Line Shape)

In the foregoing embodiment, using average positions (weighted centers) of local maximum points and local minimum points, the characteristic of a line shape is extracted, but there is often a demand to determine the similarity degree of plural lines. For example, in an applied case where the user inputs a change in a stock price over time using the touch pen, and searches a stock having a similar change, it is necessary to appropriately use a characteristic extracted in the foregoing fashion, and to determine the similarity degree of line shapes. Hereinafter, an explanation will be given of a technology of determining the similarity degree of line shapes.

To compare two line shapes, first, it is necessary to perform appropriate normalization on the two lines. Hereinafter, let us suppose that an X axis is defined from right to left along a horizontal direction, a Y axis is defined from top to bottom along a vertical direction, and lines to be compared are arranged in the X-Y plane in accordance with the foregoing embodiment.

First, when the horizontal widths (widths in X axis direction) of the two lines differ, conversion is carried out to enlarge or scale down one of the lines in the horizontal direction (X axis direction) and to make the horizontal widths of the two lines equal. At this time, when the ratio between the lengths of both lines is larger than some constant (e.g., 2, 3, or 5), or smaller than another constant (e.g., 0.5, 0.333 or 0.2), the two lines have too different sizes, and it is desirable to determine that both lines are "difficult to determine the similarity degree" or "not similar".

When a line is discontinuous, a discontinuous part may be appropriately compensated (simply interconnecting by a straight line, or a method of performing spline compensation or the like can be employed), or the most recent line part (located at most right) among plural line parts may be selected.

Moreover, enlargement or scaling down in the horizontal direction may be performed on both lines, and it is typical to scale down both lines.

For example, according to the foregoing embodiment, for i=0, ..., 319, values F[i] are stored in the coordinate storing unit 203, and to scale down those values into a width W and to define values f[k] for k=0, 1, ..., W−1, $$f[k]=\Sigma_{i=0}^{W/320}F[kW/320+i](W/320)$$

is calculated, and a conversion is carried out in such a way that a value f[k] with respect to k becomes an average value of a value f[i] with respect to in interval i=kW/320, kW/320+1, ..., (k+1)W/320−1.

Hereinafter, to facilitate understanding, let us suppose that appropriate selection and conversion are carried out for both lines, lines are not discontinuous, and the widths thereof are normalized to W.

Further, let us suppose that normalization results of both two lines are stored in arrays f and g of an element W in the RAM 103. Moreover, let us suppose that the arrays f and g mean a line itself.

Next, to adjust the heights of the two lines in the Y axis direction, weighted centers thereof are acquired respectively. In the foregoing embodiment, because an Y coordinate values of an X coordinate value i are f[i], and g[i], respectively, respective heights p and q in the Y axis direction can be acquired from:

$$p=\Sigma_{i=0}^{W-1}F[i]/W; \text{ and}$$

$$q=\Sigma_{i=0}^{W-1}G[i]/W.$$

Then, when the heights are adjusted, a difference Δ[i] between two lines f and g at the same X coordinate value [i] can be calculated from:

$$\Delta[i]=(F[i]-p)-(G[i]-q).$$

In regard to the similarity degree L(f, g) of the two lines f and g, a method of using the following equation which utilizes a sum of squares is possible.

$$L(f,g)=\Sigma_{i=0}^{W-1}\Delta[i]^2.$$

That is, if L(f, g) is smaller and smaller, both two lines are similar.

However, like a stock price movement, whether or not a shape is a flag or a pennant, and the most recent stock price movement are important. On the other hand, as explained above, compressing information of a width 320 to a width W corresponds to elimination of a so-called high-frequency component, so that information on a flag or a pennant which is a high-frequency component itself is to be omitted.

Accordingly, it is desirable to determine beforehand whether or not lines F and G of the two lines f and g prior to compression are "flag", "pennant", "non-flag, non-pennant (hereinafter, "normal")", and then to calculate a similarity degree using this information.

In order to do so, W number of positive value weighting parameters are used.

$$w[0],w[1],\ldots,w[W-1]$$

Such weighting parameters are set to values in such manner as to have the following relationships using a constant N (0<N<W) based on whether or not the shapes of original lines F and G of the two lines f and g prior to conversion are "flag", "pennant" or "normal". Here, it is desirable that the width prior to scaling down corresponding to W−N should correspond to Z in the foregoing embodiment.

(1) When both are "normal", $$w[0]=w[1]=w[N-1]=1=w[N]=$$
$$W[N+1]=\ldots,=W[W-1]=1$$

(2) When both are "flag" or both are "pennant", $$w[0]=w[1]=\ldots w[N-1]=1>s[N]=$$
$$W[N+1]=\ldots=W[W-1]=f\!f\!pp=0.5$$

(3) When either one is "normal" and the other is "flag" or "pennant", due to the constant N (0<N<W), $$w[0]=w[1]=\ldots w[N-1]=1<w[N]=$$
$$W[N+1]=\ldots=W[W-1]=nfp=2$$

(4) When either one is "flag" and the other is "pennant", due to the constant N (0<N<W), $$w[0]=w[1]=\ldots w[N-1]=1<w[N]=$$
$$W[N+1]=\ldots=W[W-1]=fp=0.8$$

Then, the similarity degree is defined as follow:

$$L(f,g)=\Sigma_{i=0}^{W-1}w[i]\Delta[i]^2.$$

That is, in regard to a segment i=N, N+1, ..., W−1 where a flag or a pennant may present, changes in a line shape are reflected on the similarity degree by appropriately changing the weighting as explained above.

Note that, as explained above, in regard to the weighting to be changed, it is set that ffpp=0.5, and fp=0.8, but in regard to the magnitude relation thereof, if a relationship $$f\!f\!pp<fp<1<nfp$$

is satisfied, various constants other than the foregoing constants can be used. Moreover, a parameter setting such that w[N], w[N+1], ..., w[W−1] change flatly toward ffpp, fp, and nfp may be employed.

As explained above, in regard to the two lines G and F, arrays f and g where high frequency components are eliminated are taken into account, the weighting w is defined based on the characteristic of a shape "flag", "pennant" or "normal" detected for each of F and G, and the similarity degree L(f, g) is calculated based on those information, it becomes possible to determine how much both lines are similar.

Therefore, when there are data on shapes of plural lines $G_1, \ldots G_D$, the similarity degree to a line shape F input by the user is calculated for each line, and the lines are sorted in the order of smaller similarity degree, a line having a shape similar to the line F among the lines $G_1, \ldots G_D$ can be presented to the user, or it is possible to allow the user to select one.

Figure 11:
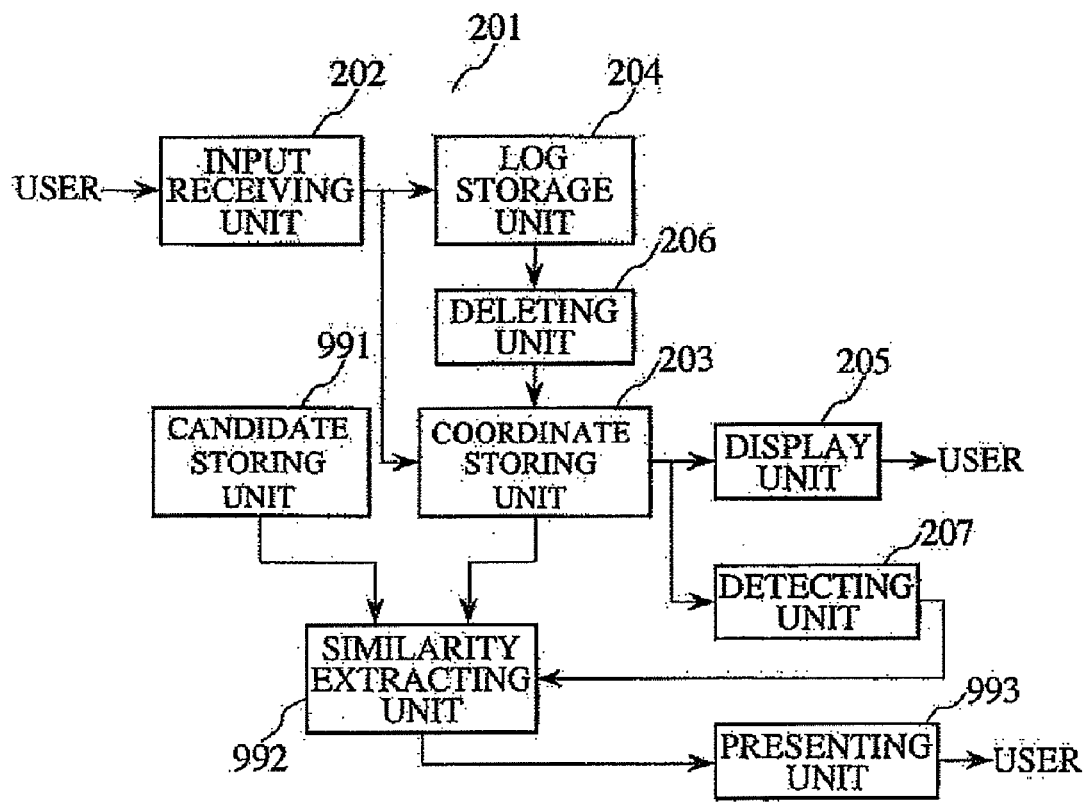
FIG. 11 is an explanatory diagram showing the general structure of a line shape processing device according to an embodiment.

FIG. 11 is an exemplary diagram showing the general structure of a line shape processing device realizing such an embodiment. Hereinafter, an explanation will be given with reference to this diagram. Note that the same reference numeral denotes each structural element having the same function as that of FIG. 2, and explanation will be additionally given to elements having different functions to facilitate understanding.

A line shape processing device 201 further has a candidate storing unit 991, a similarity extracting unit 992, and a presenting unit 993 in addition to the elements of the foregoing embodiment.

The candidate storing unit 991 stores data on the shapes of plural lines $G_1, \ldots G_D$, and corresponds to a database of a stock price movement. Those data may be updated as time advances, but when a fixed value for an application like a computation simulation is used, if it is determined for each shape whether or not the shape is "flag", "pennant" or "normal" beforehand and arrays $g_1, \ldots, g_D$ after widths are converted into a predetermined width W are prepared, calculation of the similarity degree becomes easy.

On the other hand, the similarity extracting unit 992 utilizes a detection result of "flag", "pennant", or "normal" performed by the detecting unit 207 on the shape of the line F input by the user, compares the shape of the line F with the lines to be compared based on the foregoing similarity degree calculation process having undergone weighting, sorts the plural lines $G_1, \ldots G_D$, or calculates the similarities successively, compares it with a similarity degree calculated so far, keeps a predetermined number of lines having a small similarity degree value, and extracts a predetermined number of lines similar to the plural lines $G_1, \ldots G_D$.

Further, the presenting unit 993 presents information on lines extracted as to be similar to the line F and having predetermined orders in the higher rank, and prepares for the following processes. For example, the presenting unit displays extracted lines together with summary information on the stock brands associated with those lines. When the user selects any one of the extracted lines, summary information on the brand of a stock associated with the selected line is presented.

According to the embodiment, in expressing a stock price movement or the like with a graph, it is possible to calculate the similarity degree of a graph based on a matter which must be focused on, thereby facilitating the user to search a desired brand based on a stock price movement.

The present application claims the benefit of the priority based on Japanese Patent Application No. 2006-172208, and the contents of which are incorporated in this application if the laws and ordinances of designated countries permit.

INDUSTRIAL APPLICABILITY

As explained above, according to the present invention, it becomes possible to provide a line shape processing device and a line shape processing method which are suitable for detecting the characteristic of the end portion of a line shape and for determining the similarity degree of a line shape based on the detected characteristic, a computer-readable information recording medium which stores a program for realizing the foregoing device and method, and such a program.

The invention claimed is:

1. A line shape processing device that processes a shape of a line having a position in a two-dimensional domain, the position being specified by a pair of a first coordinate value, which is a coordinate value in a first coordinate axis direction, and a second coordinate value, which is a coordinate value in a second coordinate axis direction different from the first coordinate axis direction, and the device comprising:
   a coordinate storing unit that stores a first coordinate value of a point included in a line input by a user and only one second coordinate value of that point in association with the first coordinate value; and
   a detecting unit that detects whether a shape of an end portion of the line input by the user is any one of the followings:
   (a) a pennant shape where vibration amplitude gradually converges while vibrating;
   (b) a flag shape vibrating at a substantially constant vibration amplitude; or
   (c) a normal shape other than the shapes of (a) and (b) from the stored first coordinate value and second coordinate value of the point included in the line on the basis of a distribution of extreme values of the second coordinate value,
   the coordinate storing unit stores a first coordinate value of the point included in the line in association with only one second coordinate value of that point by taking a value of an element of an array, having a subscript that is a first coordinate value of the point included in the line, as a second coordinate value of that point, and
   the detecting unit scans first coordinate values that are the subscript of the array in a direction from the maximum value of the first coordinate value to the minimum value thereof in regard to stored first coordinate value and second coordinate value of the point included in the line that is stored, compares a second coordinate value stored and associated right before the first coordinate value and a second coordinate value stored and associated right after the first coordinate value with a second coordinate value stored in association with the first coordinate value detects respectively 2W (W≧1) number of coordinates of points where the second coordinate value becomes local maximum and coordinates of points where the second coordinate value becomes local minimum, and when 2W number of respective kinds of coordinates are detected, compares a difference between second coordinate values of W number of weighted centers detected in first among points which become local maximum and second coordinate values of W number of weighted centers detected in first among points which become local minimum with a difference between second coordinate values of W number of weighted centers detected second among points which become local maximum and second coordinate values of W number of weighted centers detected second among points which become local minimum, and detects the shape of the line as:
   (a) a flag shape vibrating at a substantially constant vibration amplitude, if a difference at a starting side of the line and a difference at an ending side of the line is equal within a predetermined error range;
   (b) a pennant shape where vibration amplitude gradually converges while vibrating, if (a) is not satisfied and the difference at the ending side is larger than the difference at the starting side; or
   (c) a normal shape if (a) and (b) are not satisfied or 2W number of points where the second coordinate value becomes local maximum and points where the second coordinate value becomes local minimum are not detected respectively.

2. The line shape processing device according to claim 1, further comprising
   an input receiving unit that receives a depressing operation to a surface of a screen as a first-kind-instruction inputting which specifies a position in the two-dimensional domain associated with a portion which is subjected to the depressing operation, and receives a releasing operation from the screen as a second-kind-instruction inputting.

3. The line shape processing device according to claim 1, further comprising
   a deleting unit, and wherein when a predetermined number of reception of the first-kind-instruction inputting are successively carried out, and for all pairs of adjoining first-kind-instruction inputting among successively carried out first-kind-instruction inputting, if an angle between a vector from a position specified by a pair of previous first-kind-instruction inputting to a position specified by a pair of later first-kind-instruction inputting and a vector in a direction in which only the first coordinate value is changed in a predetermined order in the two-dimensional domain is greater than or equal to a predetermined obtuse angle, the deleting unit deletes second coordinate values, stored in the coordinate storing unit in association with first coordinate values specified by each of successively carried out first-kind-instruction inputting within a range from the minimum value of a first coordinate value to a maximum value thereof, from the coordinate storing unit.

4. The line shape processing device according to claim 1, wherein
when the detecting unit detects that the shape of the end portion of the line is a pennant shape or a flag shape, the detecting unit compares a sum of second coordinate values of starting-side half of weighted centers of points which become local maximum and second coordinate values of starting-side half of weighted centers of points which become local minimum with a sum of second coordinate values of ending-side half of weighted centers of points which becomes local maximum and second coordinate values of ending-side half of weighted centers of points which becomes local minimum, and detects that the line shape is:
(p) flat if the sum at the starting side is equal to the sum at the ending side within a predetermined error range;
(q) uprising if (p) is not satisfied and the sum at the starting side is smaller than the sum at the ending side; or
(r) falling if (p) and (q) are not satisfied.

5. The line shape processing device according to claim 1, further comprising:
a candidate storing unit that stores, for each of shapes of plural lines prepared beforehand, a first coordinate value of a point included in a line, and a second coordinate value of that point in association with the first coordinate value of that point;
a similarity extracting unit that calculates a similarity degree between each of the shapes of the plural lines stored in the candidate storing unit and a shape of a line stored in the coordinate storing unit, extracts a line having a small calculated similarity degree from the plural lines, wherein a similarity degree is a total sum of a value acquired by multiplying a square of a difference in second coordinate values of two lines subjected to similarity degree calculation at a same first coordinate value by a weighting factor determined based on whether the shapes of end portions of the two lines are a combination of a pennant shape, a flag shape, or a normal shape; and
a presenting unit that presents the extracted line shape to a user.

6. The line shape processing device according to claim 1, wherein
each of the plural lines prepared beforehand represents a change in a trade-target value over time associated with that line among plural trade targets,
a shape of a line input by the user is a shape in which a change in a trade-target value over a time subjected to searching by the user is input from past to present, and
the presenting unit presents the extracted line shape and information on a trade target associated with that line to the user.

7. A line shape processing method for processing a shape of a line having a position in a two-dimensional domain specified by a pair of a first coordinate value, which is a coordinate value in a first coordinate axis direction, and a second coordinate value, which is a coordinate value in a second coordinate axis direction different from the first coordinate axis direction, and for using a coordinate storing unit that stores a first coordinate value of a point included in a line input by a user and only one second coordinate value of that point in association with the first coordinate value, the method comprising:
an input receiving step of receiving a first-kind-instruction inputting which specifies a position of a point, relative to a display, included in a line in the two-dimensional domain, and a second-kind-instruction inputting different from the first-kind-instruction inputting;
a storing step of, when reception of first-kind-instruction inputting are successively carried out, for individual first coordinate values included in a range from a first coordinate value at a start position specified by a previous first-kind-instruction inputting to a first coordinate value at an end position specified by a later first-kind-instruction inputting, storing in a coordinate storing unit a second coordinate value of a point, included in a line interconnecting the start position and the end position and having the first coordinate value, in association with the first coordinate value in the coordinate storing unit; and
a detection step of detecting, using a processor, that a shape of an end portion of a line input by the user is any one of the followings:
(a) a pennant shape where vibration amplitude gradually converges while vibrating;
(b) a flag shape vibrating at a substantially constant vibration amplitude; or
(c) a normal shape other than the shapes of (a) and (b) from the stored first coordinate value and second coordinate value of that point included in that line based on a distribution of extreme values of the second coordinate value,
the storing step including the step of storing a first coordinate value of the point included in the line in association with only one second coordinate value of that point by taking a value of an element of an array, having a subscript that is a first coordinate value of the point included in the line, as a second coordinate value of that point, and
the detecting step including the steps of scanning first coordinate values that are the subscript of the array in a direction from the maximum value of the first coordinate value to the minimum value thereof in regard to stored first coordinate value and second coordinate value of the point included in the line that is stored, comparing a second coordinate value stored and associated right before the first coordinate value and a second coordinate value stored and associated right after the first coordinate value with a second coordinate value stored in association with the first coordinate value, detecting respectively 2W (W≧1) number of coordinates of points where the second coordinate value becomes local maximum and coordinates of points where the second coordinate value becomes local minimum, and when 2W number of respective kinds of coordinates are detected, comparing a difference between second coordinate values of W number of weighted centers detected in first among points which become local maximum and second coordinate values of W number of weighted centers detected in first among points which become local minimum with a difference between second coordinate values of W number of weighted centers detected second among points which become local maximum and second coordinate values of W number of weighted centers detected second among points which become local minimum, and detecting the shape of the line as:
(a) a flag shape vibrating at a substantially constant vibration amplitude, if a difference at a starting side of the line and a difference at an ending side of the line is equal within a predetermined error range;
(b) a pennant shape where vibration amplitude gradually converges while vibrating, if (a) is not satisfied and the difference at the ending side is larger than the difference at the starting side; or (c) a normal shape if (a) and (b) are not satisfied or 2W number of points where the second coordinate value becomes local maximum and points where the second coordinate value becomes local minimum are not detected respectively.

8. A computer-readable information recording medium that records a program which allows a computer to process a line having a position in a two-dimensional domain specified by a pair of a first coordinate value, which is a coordinate value in a first coordinate axis direction, and a second coordinate value, which is a coordinate value in a second coordinate axis direction different from the first coordinate axis direction, and wherein the program allows the computer to function as:

a coordinate storing unit that sores a first coordinate value of a point included in a line input by a user and only one second coordinate value of that point in association with the first coordinate value; and a detecting unit that detects a shape of an end portion of the line input by the user as being any one of the followings:

(a) a pennant shape where vibration amplitude gradually converges while vibrating;

(b) a flag shape vibrating at a substantially constant vibration amplitude; or (c) a normal shape other than the shapes of (a) and (b) from the stored first coordinate value and second coordinate value of the point included in that line based on a distribution of extreme values of the second coordinate value, the coordinate storing unit stores a first coordinate value of the point included in the line in association with only one second coordinate value of that point by taking a value of an element of an array, having a subscript that is a first coordinate value of the point included in the line, as a second coordinate value of that point, and the detecting unit scans first coordinate values that are the subscript of the array in a direction from the maximum value of the first coordinate value to the minimum value thereof in regard to stored first coordinate value and second coordinate value of the point included in the line that is stored, compares a second coordinate value stored and associated right before the first coordinate value and a second coordinate value stored and associated right after the first coordinate value with a second coordinate value stored in association with the first coordinate value, detects respectively 2W (W≧1) number of coordinates of points where the second coordinate value becomes local maximum and coordinates of points where the second coordinate value becomes local minimum, and when 2W number of respective kinds of coordinates are detected, compares a difference between second coordinate values of W number of weighted centers detected in first among points which become local maximum and second coordinate values of W number of weighted centers detected in first among points which become local minimum with a difference between second coordinate values of W number of weighted centers detected second among points which become local maximum and second coordinate values of W number of weighted centers detected second among points which become local minimum, and detects the shape of the line as:

(a) a flag shape vibrating at a substantially constant vibration amplitude, if a difference at a starting side of the line and a difference at an ending side of the line is equal within a predetermined error range;

(b) a pennant shape where vibration amplitude gradually converges while vibrating, if (a) is not satisfied and the difference at the ending side is larger than the difference at the starting side; or (c) a normal shape if (a) and (b) are not satisfied or 2W number of points where the second coordinate value becomes local maximum and points where the second coordinate value becomes local minimum are not detected respectively.

\* \* \* \* \*